(12) United States Patent
Li

(10) Patent No.: US 12,182,692 B2
(45) Date of Patent: Dec. 31, 2024

(54) NEURAL NETWORK OPERATION METHOD AND APPARATUS BASED ON A CHIP HAVING AN OPERATION ARRAY

(71) Applicant: Tencent Technology (Shenzhen) Company Limited, Guangdong (CN)

(72) Inventor: Jiaxin Li, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 888 days.

(21) Appl. No.: 17/334,205

(22) Filed: May 28, 2021

(65) Prior Publication Data

US 2021/0287076 A1 Sep. 16, 2021

Related U.S. Application Data

(63) Continuation of application No. PCT/CN2020/074096, filed on Jan. 31, 2020.

(30) Foreign Application Priority Data

Jan. 31, 2019 (CN) .......................... 201910101463.X

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 5,822,742 | A | * | 10/1998 | Alkon ....................... G06N 3/04 706/31 |
| 8,103,606 | B2 | * | 1/2012 | Moussa .................. G06N 3/063 706/31 |
| 9,336,239 | B1 | * | 5/2016 | Hoffmann ........... H04L 63/1416 |
| 9,747,546 | B2 | | 8/2017 | Ross et al. |

(Continued)

FOREIGN PATENT DOCUMENTS

| | | |
|---|---|---|
| CN | 107239823 A | 10/2017 |
| CN | 108647777 A | 10/2018 |
| CN | 110163338 A | 8/2019 |

OTHER PUBLICATIONS

International Search Report and concise translation regarding PCT/CN2020/074096 dated Apr. 28, 2020, 11 pages.

*Primary Examiner* — Ryan Barrett
(74) *Attorney, Agent, or Firm* — Crowell & Moring

(57) ABSTRACT

An operation method based on a chip having an operation array is provided, including: obtaining a neural network model including D neural network layers, each neural network layer being used for operating M*N neurons; determining, from M*N*D neurons of the D neural network layers, K neurons to be operated corresponding to each operation clock cycle, and inputting the K neurons to K rows of operation units of an operation array; and performing an operation on the inputted K neurons in the each operation clock cycle by using the operation array. The M*N*D neurons are mapped to K dimensions and then allocated to the K rows of operation units. The operation array is used for operating the neural network model in a full-load operation mode.

20 Claims, 15 Drawing Sheets

(56) References Cited

U.S. PATENT DOCUMENTS

| | | | |
|---|---|---|---|
| 11,841,920 B1* | 12/2023 | Marsden | G06T 7/248 |
| 2016/0342891 A1* | 11/2016 | Ross | G06F 15/8046 |
| 2018/0157962 A1* | 6/2018 | Henry | G06N 3/045 |
| 2018/0165575 A1* | 6/2018 | Henry | G06N 3/045 |
| 2018/0189645 A1* | 7/2018 | Chen | G06N 3/049 |
| 2018/0314671 A1 | 11/2018 | Zhang et al. | |
| 2019/0303740 A1* | 10/2019 | Arthur | G06N 3/063 |
| 2020/0294249 A1* | 9/2020 | Li | G06T 7/35 |
| 2021/0241071 A1* | 8/2021 | Lorrain | G06N 3/063 |
| 2022/0083865 A1* | 3/2022 | Riazi | G06F 21/71 |
| 2022/0092395 A1* | 3/2022 | Murata | G06N 3/063 |

* cited by examiner

NEURAL NETWORK OPERATION METHOD AND APPARATUS BASED ON A CHIP HAVING AN OPERATION ARRAY

RELATED APPLICATION

This application is a continuation of and claims priority to PCT International Application No. PCT/CN2020/074096, filed with the China National Intellectual Property Administration on Jan. 31, 2020, entitled "Operation Method and Apparatus Based on Chip Having Operation Array, and Chip," which is based on and claims priority to Chinese Patent Application No. 201910101463X, filed with the China National Intellectual Property Administration on Jan. 31, 2019 and entitled "OPERATION METHOD AND APPARATUS BASED ON CHIP HAVING OPERATION ARRAY, TERMINAL, AND CHIP", which are incorporated herein by reference in their entireties.

FIELD OF THE TECHNOLOGY

This application relates to the field of artificial intelligence, and in particular, to an operation method and apparatus based on a chip having an operation array of artificial intelligence circuits, and a chip thereof.

BACKGROUND

Artificial intelligence (AI) chips are suitable for performing an operation on artificial intelligence (alternatively referred to as artificial intelligence processing). For example, an AI chip may be used for neural network model operation.

A neural network model may be abstracted into a three-dimensional cube, and the three dimensions respectively correspond to a length, a width, and a depth of the neural network model. One operation matrix on the AI chip may be abstracted into a two-dimensional plane and formed by a plurality of rows multiplied by a plurality of columns of operation units. For example, a neural network model may include 3*3*3 convolution kernels, and an operation matrix includes 8*8 operation units, nine pieces of data in the first convolutional layer of the neural network model are inputted into the first row of operation units of the operation matrix in an order from left to right and from top to bottom; nine pieces of data in the second convolutional layer of the neural network model are inputted into the second row of operation units of the operation matrix in the order from left to right and from top to bottom; and nine pieces of data in the third convolutional layer of the neural network model are inputted into the third row of operation units of the operation matrix in the order from left to right and from top to bottom. According to the above manner, nine clock cycles are required to complete the operation of a neural network model.

In the same clock cycle, only first to third rows of operation units on the operation matrix are in an operation state, and the remaining fourth to eighth rows are in an idle state, resulting in low utilization of the entire chip. It can be learned that a neural network model is operated in the manner, when a depth of the neural network model is equal to a quantity of rows of the operation array, a full-load operation of the operation array can be implemented; and when the depth of the neural network model is less than or greater than the quantity of rows of the operation array, the full-load operation of the operation array cannot be implemented or the operation array cannot perform an operation, resulting in poor compatibility.

SUMMARY

According to various embodiments provided in this disclosure, an operation method and apparatus based on a chip having an operation array and a chip are provided.

According to an aspect of this disclosure, an operation method based on a chip having an operation array is provided, performed by a computer device including the chip, the operation array including K rows of operation units, the method including:

obtaining a neural network model to be operated, the neural network model including D neural network layers, each neural network layer being corresponding to M rows and N columns of neuron data;

determining, from M*N*D pieces of neuron data of the D neural network layers, K pieces of neuron data to be operated corresponding to each operation clock, and inputting the K pieces of neuron data to be operated to the K rows of operation units of the operation array; and performing an operation on the inputted K pieces of neuron data in the each operation clock by using the operation array, M, N, D, and K all being positive integers.

According to another aspect of this disclosure, an operation apparatus based on a chip having an operation array is provided, connected to an operation array, the operation array including K rows of operation units, and the apparatus including:

an obtaining module, configured to obtain a neural network model to be operated, the neural network model including D neural network layers, each neural network layer being corresponding to M rows and N columns of neuron data;

a control module, configured to determine, from M*N*D pieces of neuron data of the D neural network layers, K pieces of neuron data to be operated corresponding to each operation clock, and input the K pieces of neuron data to be operated to the K rows of operation units of the operation array; and an operation module, configured to perform an operation on the inputted K pieces of neuron data in the each operation clock by using the operation array, M, N, D, and K all being positive integers.

According to another aspect of this disclosure, a computer device is provided, equipped with a chip having an operation array, the chip including: a storage array, a processor, and the operation array, the processor being electrically connected to the storage array, the processor being electrically connected to the operation array, and the operation array including K rows and L columns of operation units;

the storage array being configured to store a neural network model, the neural network model including D neural network layers, each neural network layer being corresponding to M rows and N columns of neuron data;

the processor being configured to obtain the neural network model to be operated, determine, from M*N*D pieces of neuron data of the D neural network layers, K pieces of neuron data to be operated corresponding to each operation clock, and input the K pieces of neuron data to be operated to the K rows of operation units of the operation array;

the operation array being configured to perform an operation on the inputted K pieces of neuron data in the each operation clock by using the operation array, M, N, D, and K all being positive integers.

According to another aspect of this disclosure, a chip having an operation array is provided, applicable to operation of a neural network model, and the chip including: a storage array, a first programmable logic circuit, a second programmable logic circuit, and the operation array, the first programmable logic circuit being electrically connected to the storage array and the second programmable logic circuit, the second programmable logic circuit being electrically connected to the storage array and the operation array, the operation array including K rows and L columns of operation units;

the storage array being configured to store a neural network model, the neural network model including D neural network layers, each neural network layer being corresponding to M rows and N columns of neuron data;

the first programmable logic circuit being configured to obtain the neural network model to be operated;

the second programmable logic circuit being configured to determine, from M*N*D pieces of neuron data of the D neural network layers, K pieces of neuron data to be operated corresponding to each operation clock, and input the K pieces of neuron data to be operated to the K rows of operation units of the operation array;

the operation array being configured to perform an operation on the inputted K pieces of neuron data in the each operation clock, M, N, D, and K all being positive integers.

According to another aspect of this disclosure, a non-volatile computer-readable storage medium is provided, storing computer-readable instructions, the computer-readable instructions, when executed by one or more processors, causing the one or more processors to perform the steps of the operation method based on a chip having an operation array.

Details of one or more embodiments of this disclosure are provided in the accompanying drawings and descriptions below. Other features, objectives, and advantages of this disclosure become apparent from the specification, the accompanying drawings, and the claims.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

To make the objectives, technical solutions, and advantages of this disclosure clearer, implementations of this disclosure are further described below in detail with reference to the accompanying drawings.

Common neural network models include a perceptron, convolutional neural networks (CNNs), deconvolutional networks (DNs), recurrent neural networks (RNNs), a long/short term memory (LSTM) network, hopfield networks (HNs), a boltzmann machine (BM) network, deep belief networks (DBNs), an autoencoders (AE), and the like.

Typically, a neural network model may be abstracted into a three-dimensional cube, and the three dimensions respectively correspond to a length M, a width N, and a depth D of the neural network model. Each depth plane includes M*N neurons, and each neuron is used for operating respective neuron data. An AI chip for operating the neural network model includes one or more operation arrays, and each operation array may be abstracted into a two-dimensional plane and formed by a plurality of rows multiplied by a plurality of columns of operation units. Each operation unit is configured to perform an operation on one piece of neuron data in one operation clock.

Figure 1:
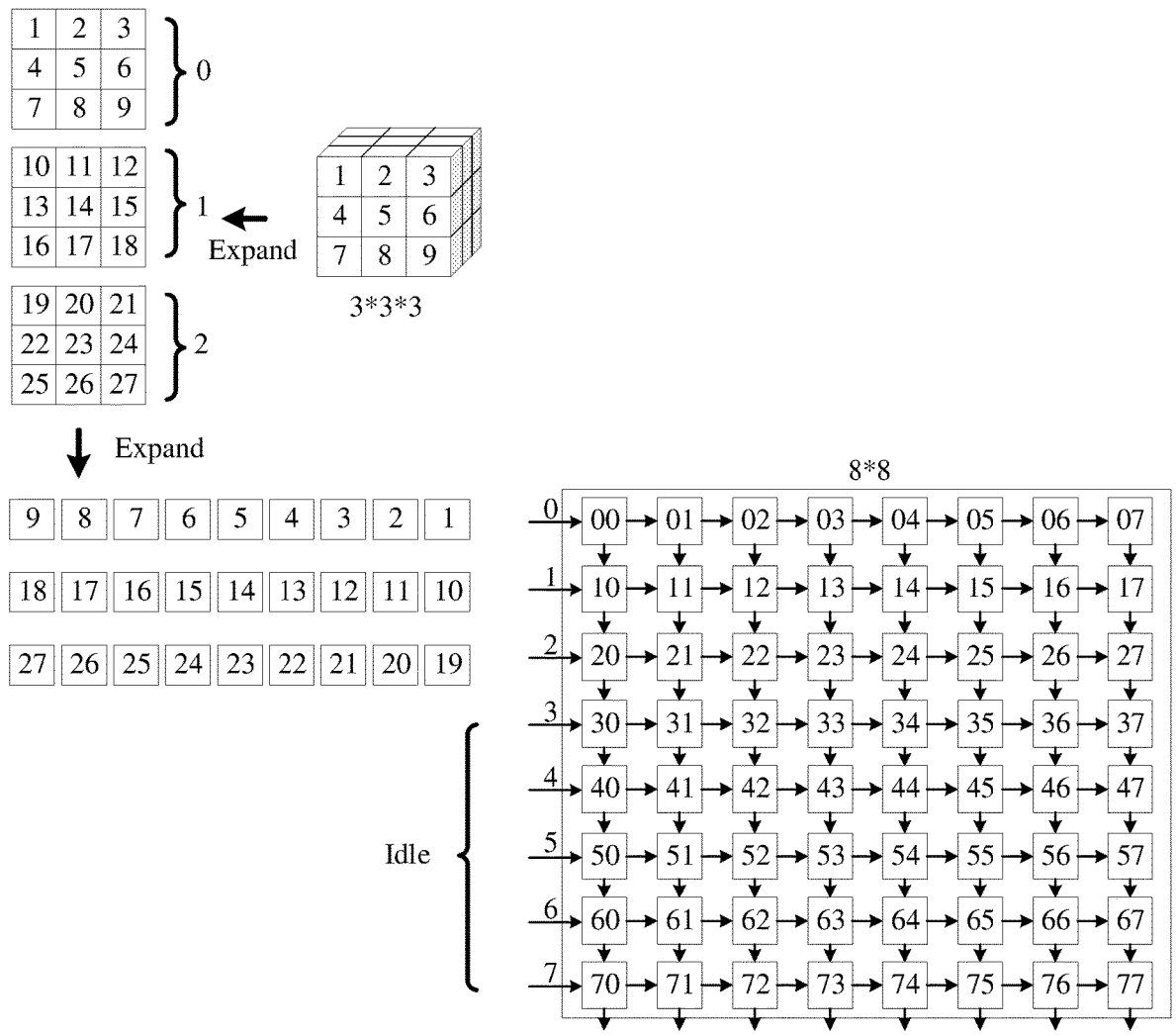
FIG. 1 is a schematic diagram of an operation method based on a chip having an operation array according to the related art.

In the related art, an operation manner of the neural network model is to expand neuron data in D depth planes in the neural network model in a row order, and then map the neuron data to D rows of the operation array for operation. Referring to FIG. 1, for example, a neural network model includes 3*3*3 neurons, and an operation matrix includes 8*8 operation units. After nine pieces of neuron data in the first convolutional layer 0 of the neural network model are expanded in an order from left to right and from top to bottom, the nine pieces of neuron data are inputted into the first row of operation units of the operation matrix in sequence in nine operation clocks; after nine pieces of neuron data in the second convolutional layer 1 of the neural network model are expanded in the order from left to right and from top to bottom, the nine pieces of neuron data are inputted into the second row of operation units of the operation matrix in sequence in the nine operation clocks; and after nine pieces of neuron data in the third convolutional layer 2 of the neural network model are expanded in the order from left to right and from top to bottom, the nine pieces of neuron data are inputted into the third row of operation units of the operation matrix in sequence in the nine operation clocks.

According to the operation manner, in a process of operating a 3*3*3 neural network model, only first three rows of operation units in an operation array are used, and the other five rows of operation units are all in an idle state. According to the operation manner of the neural network model in the related art, in a scenario in which a depth dimension D of the neural network model is less than a quantity K of rows of operation array, most operation units in the operation array are in an idle state during operation, resulting in low utilization of the chip.

In this disclosure, "*" represents a multiplication symbol, for example, "M*N" represents that M is multiplied by N.

This disclosure provides an operation method based on a chip having an operation array, neuron data in D neural network layers along a depth direction is mapped into K rows of operation units of an operation array for operation, and running with full load of the operation array is implemented in a manner of converting the neuron data from a dimension D to a dimension K.

Figure 2:
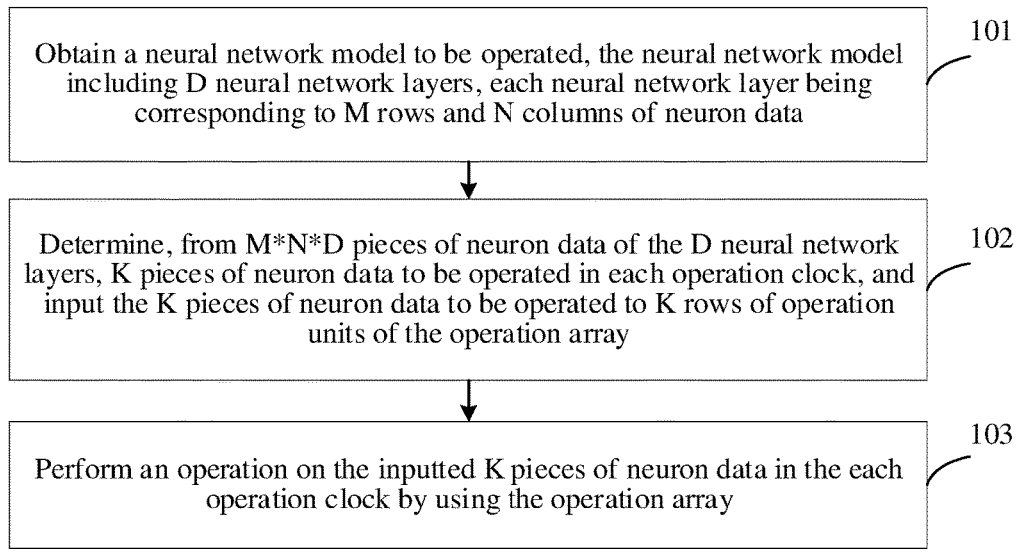
FIG. 2 is a flowchart of an operation method based on a chip having an operation array according to an exemplary embodiment of this disclosure.

FIG. 2 is a flowchart of an operation method based on a chip having an operation array according to an exemplary embodiment of this disclosure, applicable to a chip having an operation array, the operation array includes K rows of operation units, and the method includes the following steps.

Step 101. Obtain a neural network model to be operated, the neural network model including D neural network layers, each neural network layer being corresponding to M rows and N columns of neuron data.

A terminal obtains a neural network model to be operated, the neural network model includes D neural network layers, each neural network layer corresponds to M rows and N columns of neurons, and the M*N neurons are used for operating M*N pieces of neuron data to be operated.

For example, the neural network model is a convolutional neural network, the neural network model includes M*N*D convolution kernels, and the neural network model with a size being M*N*D is decoupled into D neural network layers along a depth direction. Each neural network layer is used for operating M*N pieces of neuron data, M, N, and D being positive integers. The values of M, N, and D may be the same or may be different. In some embodiments, M and N are equal and both are odd numbers.

In different embodiments, according to different types of neural network models, a neuron in a neural network layer may be at least one of a convolution kernel, a Gaussian kernel, a kernel structure, a gate structure, and a memory unit.

In different embodiments, according to different application fields of neural network models, neuron data has different physical meanings. In the field of image processing, the neuron data may be pixels in an image; in the field of Internet, the neuron data may be profile data, browsing data, payment data, or the like of a user; in the medical field, the neuron data may be human modeling data; and in the bank and financial field, the neuron data may be time series data of a financial product.

Step 102. Determine, from M*N*D pieces of neuron data of the D neural network layers, K pieces of neuron data to be operated in each operation clock, and input the K pieces of neuron data to be operated to the K rows of operation units of the operation array.

The terminal obtains K pieces of neuron data from M*N*D pieces of neuron data of the D neural network layers, and inputs the K pieces of neuron data to the K rows of operation units of the operation array in the $i^{th}$ clock.

When the M*N*D pieces of neuron data are greater than the K pieces of neuron data, after inputting K pieces of neuron data of the first clock to the K rows of operation units of the operation array, the terminal continues to determine, from the remaining unoperated neuron data in the D neural network layers, the K pieces of neuron data to be operated corresponding to the second clock, and so on, until the M*N*D pieces of neuron data are all operated in the $i^{th}$ clock.

Step 103. Perform an operation on the inputted K pieces of neuron data in the each operation clock by using the operation array.

The terminal performs an operation on the inputted K pieces of neuron data in the $i^{th}$ clock by using the operation array of K rows and L columns, L being a positive integer.

Figure 3:
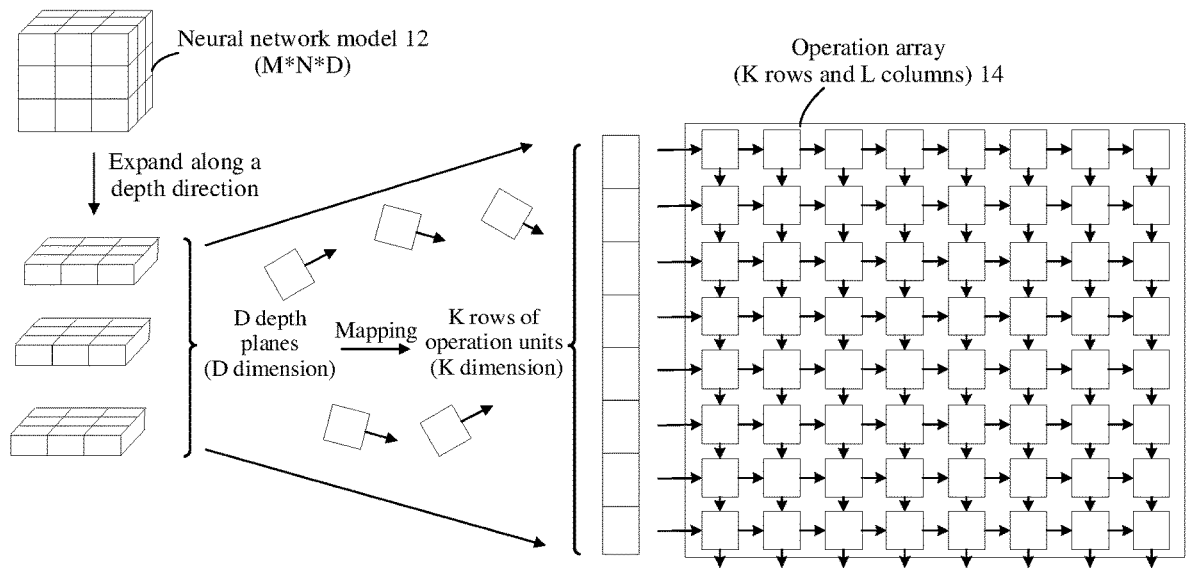
FIG. 3 is a schematic diagram of an operation method based on a chip having an operation array according to an exemplary embodiment of this disclosure.

Referring to FIG. 3, for a neural network model 12 with M*N*D neurons, the neural network model 12 is expanded according to a depth direction to obtain D depth planes, and each depth plane corresponds to respective M*N pieces of neuron data. Neuron data in the D depth planes may be viewed as D-dimensional neuron data (or D-way neuron data), and M*N*D pieces of D-dimensional neuron data are mapped into K-dimensional neuron data (or K-way neuron data) to be inputted to an operation array 14 for operation. Since each clock can enable the K rows of operation units of the operation array to perform a full-load operation, the operation efficiency of the chip can be improved.

Figure 4:
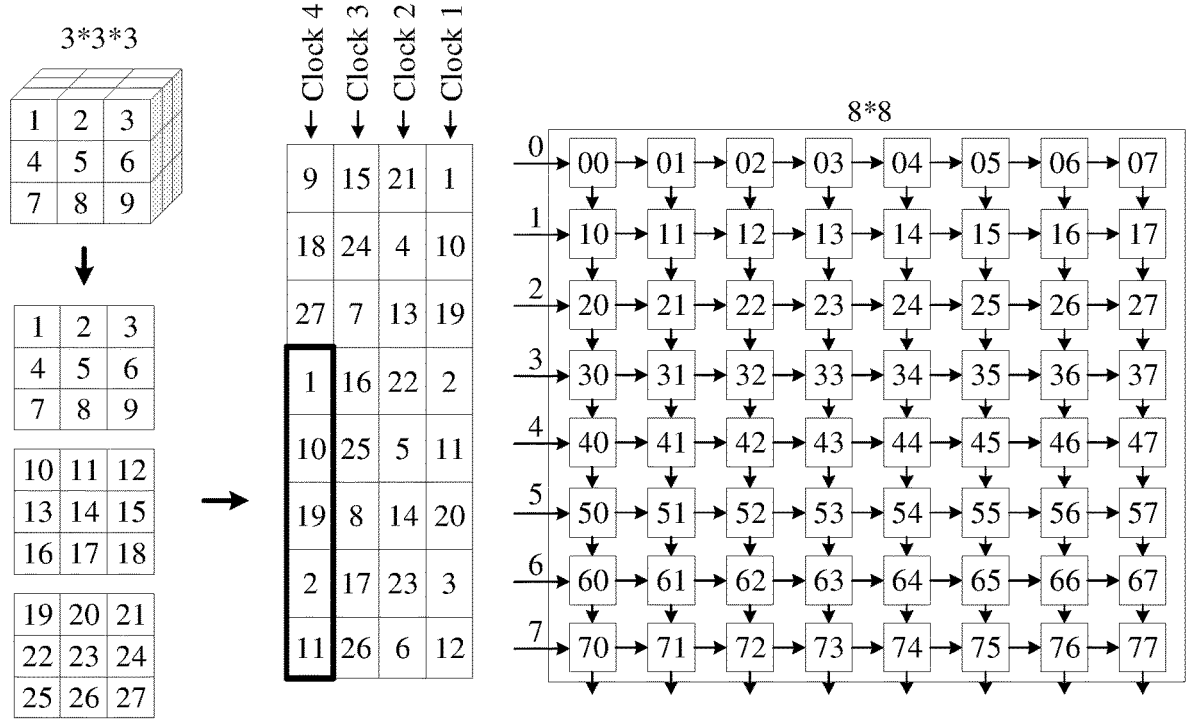
FIG. 4 is a schematic diagram of an operation method based on a chip having an operation array according to another exemplary embodiment of this disclosure.

In an exemplary example, the terminal operates a 3*3*3 neural network model by using an operation array of eight rows and eight columns, and allocates 27 pieces of neuron data in three neural network layers to eight rows of operation units. Referring to FIG. 4, eight pieces of neuron data to be operated in each of a clock 1, a clock 2, a clock 3, and a clock 4 are separately determined from the three neural network layers. In the clock 1, neuron data 1 required to be operated by a row 0 of operation units is read from the first neural network layer, subsequently, neuron data 10 required to be operated by a row 1 of operation units is read from the second neural network layer, then neuron data 19 required to be operated by a row 2 of operation units is read from the third neural network layer, and the first neural network layer is returned in a polling manner to read neuron data 2 required to be operated by a row 3 of operation units. By analogy, the eight pieces of neuron data to be operated required by the each clock are determined; the eight pieces of neuron data that are inputted to the 8*8 operation array are operated in each of the clock 1, the clock 2, the clock 3, and the clock 4; and the remaining three pieces of neuron data 9, 18, and 27 are read and operated in the clock 4.

Figure 5:
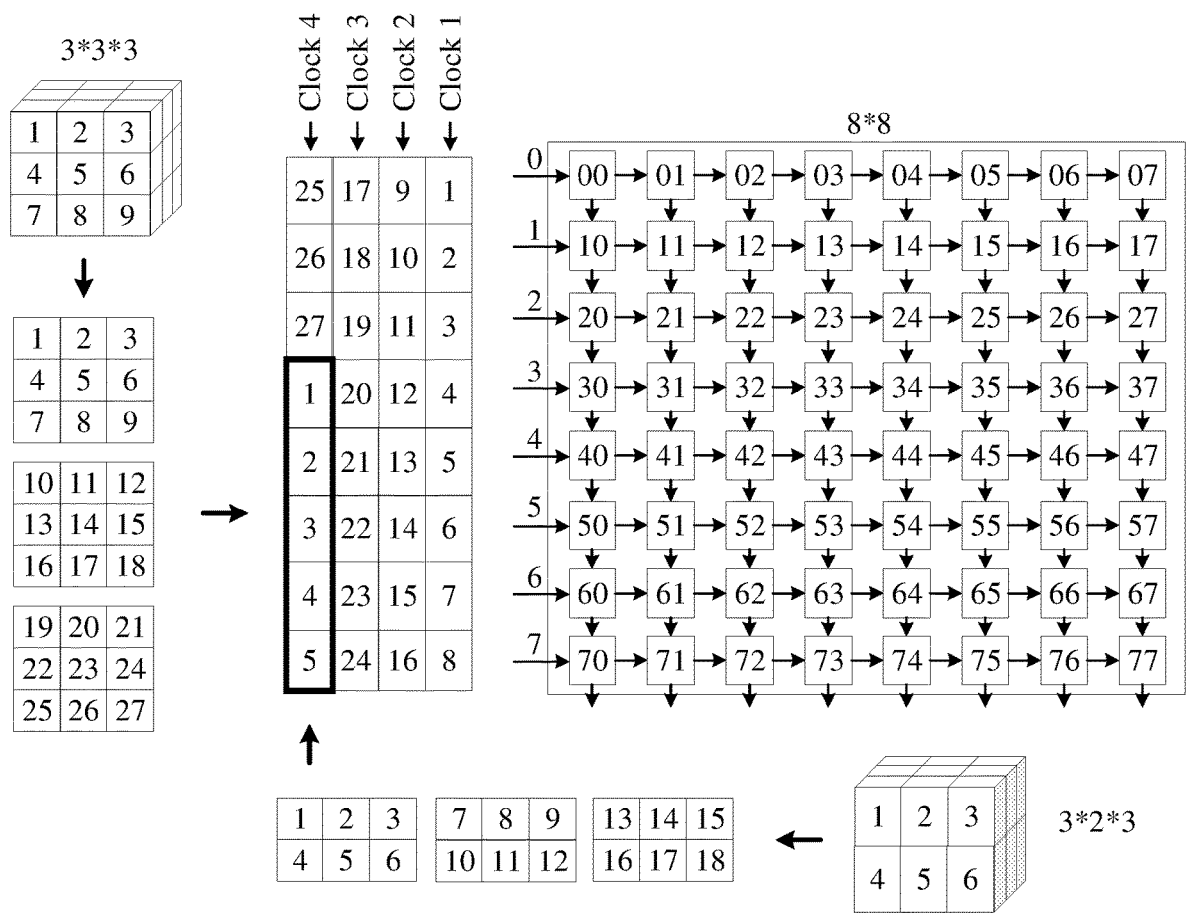
FIG. 5 is a schematic diagram of an operation method based on a chip having an operation array according to another exemplary embodiment of this disclosure.

In another exemplary example, the terminal operates a 3*3*3 neural network model by using an operation array of eight rows and eight columns, and allocates 27 pieces of neuron data in three neural network layers to eight rows of operation units. Referring to FIG. 5, eight pieces of neuron data to be operated in each of clock 1 to clock 4 are sequentially determined from each neural network layer in an order row-wise from left to right and column-wise from top to bottom, and the eight pieces of neuron data that are inputted to the 8*8 operation array are operated in each of the clock 1 to the clock 4; in the clock 2, after neuron data to be operated of a row 0 of operation units is determined, reading of neuron data in the first neural network layer is finished, and the neuron data is continued to be read from the second neural network layer in the order row-wise from left to right and column-wise from top to bottom; and the remaining three pieces of neuron data 25, 26, and 27 are read and operated in the clock 4.

Figure 6:
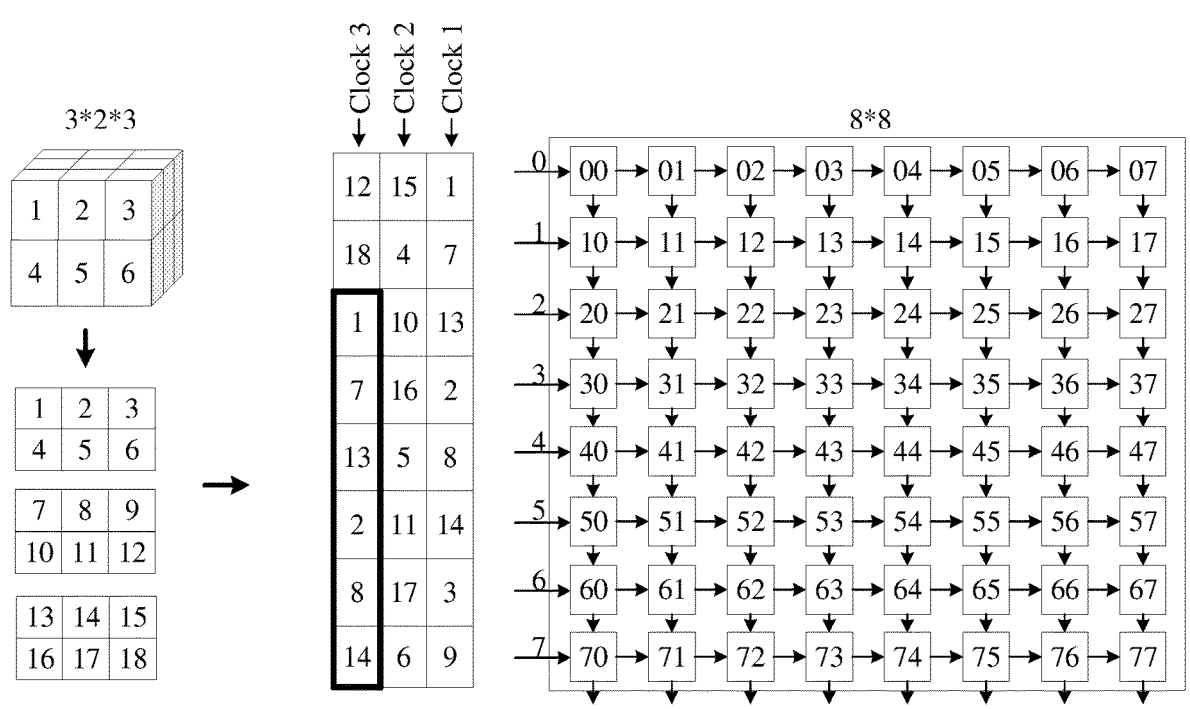
FIG. 6 is a schematic diagram of an operation method based on a chip having an operation array according to another exemplary embodiment of this disclosure.

In another exemplary example, the terminal operates a 3*2*3 neural network model by using an operation array of eight rows and eight columns, and allocates 18 pieces of neuron data in three neural network layers to eight rows of operation units. Referring to FIG. 6, eight pieces of neuron data to be operated in the clock 1, eight pieces of neuron data to be operated in the clock 2, and eight pieces of neuron data to be operated in the clock 3 are respectively determined from three neural network layers, and the eight pieces of neuron data that are inputted to the operation array of eight rows and eight columns are operated in each of the clock 1, the clock 2, and the clock 3; and the remaining neuron data 12, and 18 are read and operated in the clock 3.

Figure 7:
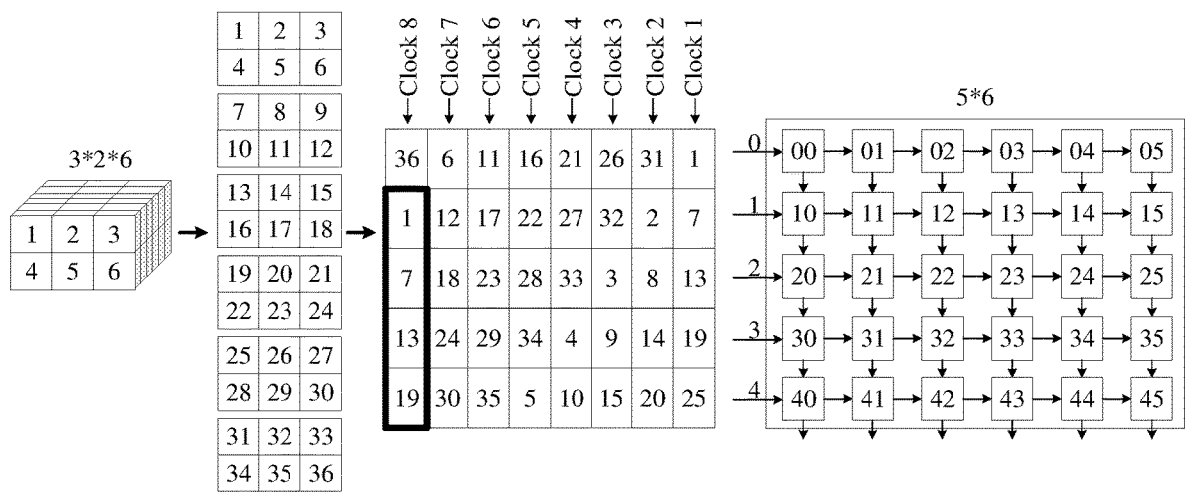
FIG. 7 is a schematic diagram of an operation method based on a chip having an operation array according to another exemplary embodiment of this disclosure.

In another exemplary example, the terminal operates a 3*2*6 neural network model by using an operation array of five rows and six columns, and allocates 36 pieces of neuron data in six neural network layers to five rows of operation units. Referring to FIG. 7, five pieces of neuron data to be operated in each of clocks 1 to 8 are respectively determined from six neural network layers, and the five pieces of neuron data that are inputted to the operation array of five rows and six columns are operated in each of the clocks 1 to 8; and the remaining neuron data 36 is read and operated in the clock 8.

Figure 8:
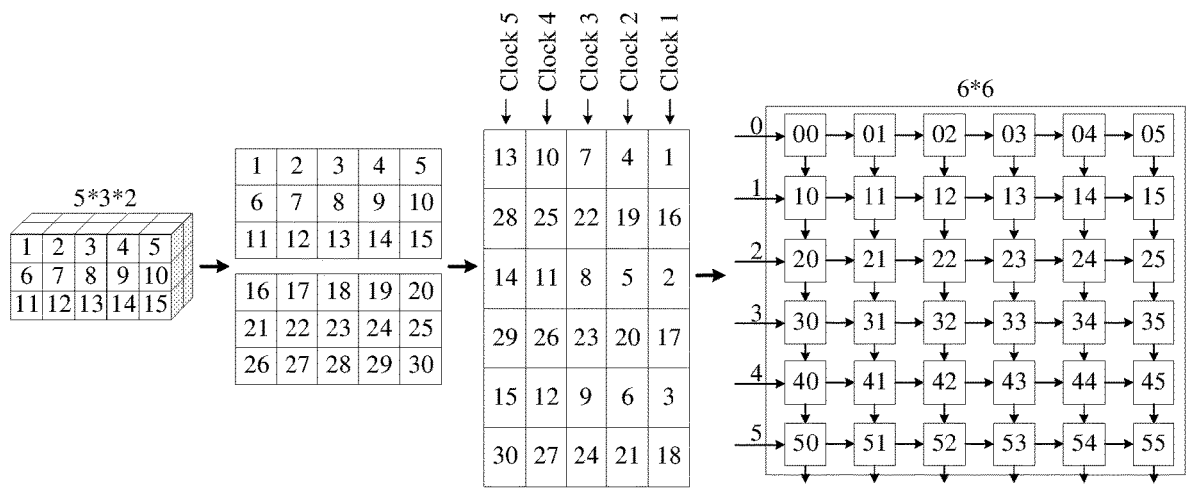
FIG. 8 is a schematic diagram of an operation method based on a chip having an operation array according to another exemplary embodiment of this disclosure.

In another exemplary example, the terminal operates a 5*3*2 neural network model by using an operation array of six rows and six columns, and allocates 30 pieces of neuron data in two neural network layers to six rows of operation units. Referring to FIG. 8, six pieces of neuron data to be operated in each of clocks 1 to 5 are respectively determined from two neural network layers, and the six pieces of neuron data that are inputted to the operation array of six rows and six columns are operated in each of the clocks 1 to 5. The neural network model includes 30 pieces of neuron data in total, a quantity of rows of operation array is six, and a quantity of pieces of neuron data is a multiple of the quantity of rows of the operation array, so that in the clock 5, the neuron data is operated completely with no need to supplement the neuron data. A depth dimension D of a neural network model is 2, a row dimension K of an operation array is 6, and the depth dimension D of the neural network model is a divisor of the row dimension K of the operation array. Therefore, a quantity of pieces of neuron data read by the terminal from each neural network layer in the clock i is equal. For example, in a clock 1, the terminal reads three pieces of neuron data 1, 2, and 3 in total from the first neural network layer and reads three pieces of neuron data 16, 17, and 18 in total from the second neural network layer; and in a clock 2, the terminal reads three pieces of neuron data 4, 5, and 6 in total from the first neural network layer and reads three pieces of neuron data 19, 20, and 21 in total from the second neural network layer.

Based on the foregoing, according to the operation method based on a chip having an operation array provided in this embodiment, a neural network model to be operated is obtained, the neural network model including D neural network layers, each neural network layer including M*N pieces of neuron data; K pieces of neuron data to be operated corresponding to each operation clock are determined from M*N*D pieces of neuron data of the D neural network layers and inputted to K rows of operation units of an operation array; and an operation is performed on the inputted K pieces of neuron data in the each operation clock by using the operation array. According to the method, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array.

In addition, in this solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

In a possible embodiment, the M*N*D pieces of neuron data may be viewed as a data cube, and the data cube is input data of the neural network model of M*N*D during operation. The data cube may be a data cube split from a larger data cube, that is, the larger data cube is split into a plurality of M*N*D data cubes for operation. In this way, in the $(i-1)^{th}$ clock, if the remaining unoperated neuron data in a currently operated data cube a is less than K pieces of neuron data, this round of operation is the last round of operation of the data cube a, and the terminal may obtain j pieces of neuron data from another data cube b that has not been operated to be supplemented as the K pieces of neuron data, and input the K pieces of neuron data to the K rows of operation units of the operation array in the $i^{th}$ clock, j being less than K.

Alternatively, in the $(i-1)^{th}$ clock, if the remaining unoperated neuron data in one data cube of an M*N*D neural network model A is less than K pieces of neuron data, that is, the remaining unoperated neuron data in a currently operated data cube is less than K, the terminal may obtain j pieces of neuron data from a data cube to be operated of another neural network model B to be supplemented as the K pieces of neuron data, and input the K pieces of neuron data to the K rows of operation units of the operation array in the $i^{th}$ clock, K, i, and j being positive integers. A quantity of rows, a quantity of columns, and a depth of the neural network model A may be the same as or may be different from that of the neural network model B. For example, a size of each of the neural network model A and the neural network model B is 3*3*3, or a size of the neural network model A is 3*3*3 and a size of the neural network model B is 3*2*5. In the operation array, an accumulation operation is not performed on the neuron data belonging to the two neural network models.

Schematically, as shown in FIG. 4, in the clock 4, the remaining unoperated neuron data in a 3*3*3 data cube is less than eight, this round of operation is the last round of operation of the data cube, and the terminal may read five pieces of neuron data from another 3*3*3 data cube for supplement. The five pieces of neuron data framed in the figure are read by the terminal from the another 3*3*3 data cube.

As shown in FIG. 5, in the clock 4, the remaining unoperated neuron data in a 3*3*3 data cube is less than eight, this round of operation is the last round of operation of the data cube, and there are no unoperated data cubes in data cubes of the corresponding 3*3*3 neural network model. The terminal may read data from a data cube of another 3*2*3 neural network model for supplement, and the five pieces of neuron data framed in the figure are read from a 3*2*3 data cube corresponding to the another 3*2*3 neural network model.

In exemplary examples shown in FIG. 6 and FIG. 7, when neuron data of the last round of operation of a data cube is less than K, for a method for supplementing the neuron data, reference may be made to the method for supplementing the neuron data shown in FIG. 4 and FIG. 5. Details are not described herein again.

Based on the foregoing, the technical solutions provided in this disclosure include at least the following three beneficial effects.

First, the utilization of the chip is higher in operating the neural network model. When neuron data in neural network models of different sizes is operated, operation arrays can run with full load, thereby implementing decoupling the operation arrays from the neural network models.

Second, the flexibility of decoupling the neural network model from the operation array is greater. For operation arrays of different sizes, in the operation method of this technical solution, neural network models of different sizes can be decoupled from the operation arrays of different sizes. For example, a 3*3*3 neural network model is decoupled from an 8*8 operation array, or a 3*3*2 neural network model is decoupled from a 2*8 operation array, or a 3*2*3 neural network model is decoupled from a 9*8 operation array.

Third, the performance and competitive strength of the chip are improved and use costs of the chip are reduced. In the operation method of this operation solution, the operation efficiency can be improved by improving the utilization of the operation units. Lower hardware costs than that of another chip can be used to achieve the same operation performance.

First, a performance indicator of an AI processor or an AI chip is a quantity of times of operations performed per second. The operation is performed by an operation array (that is, a systolic array), and each operation array is formed by K*L operation units. In this way, actual operation performance of an AI processor or an AI chip is calculated by using the following formula:

$$P_{theoretical} = \text{Frequency} * K * L * 2; \text{ and} \quad (1)$$

$$P_{actual} = P_{theoretical} * \text{Efficiency}; \quad (2)$$

where $P_{theoretical}$ is theoretical maximum performance of the AI processor or the AI chip, Frequency is a clock frequency of an operation array in the AI processor or the AI chip, K is a row of the operation array, L is a column of the operation array, $P_{actual}$ is actual performance of the AI processor or the AI chip, and Efficiency is operation efficiency of the operation array.

For example, a red-green-blue (RGB) three-dimensional image is inputted, and in the related art and this disclosure, a comparison of the utilization of operation units in operation arrays is shown in Table 1 below.

TABLE 1

| Configuration parameter | Kernel * size = 3 * 3; K = 8, L = any number | Kernel * size = 3 * 3; K = 32, L = any number |
|---|---|---|
| Related art | 37.5% | 9.375% |
| In the technical solution of this disclosure | 100% | 100% |

It can be seen from Table 1 that the utilization of the operation units in the related art is at a lower level than the utilization of the operation units in the technical solution. For example, in an 8*L operation array, a 3*3 neural network layer is operated, the utilization of operation units in the operation array in the related art is only 37.5%, and the utilization of operation units in the operation array in the solution is 100%; and in a 32*L operation array, a 3*3 neural network layer is operated, the utilization of the operation units in the operation array in the related art is only 9.375%, and the utilization of the operation units in the operation array in the solution is 100%.

The utilization of the operation units in the operation array is approximated as the operation efficiency of the operation array, and the maximum performance and the actual performance of the chip in the related art are calculated according to the calculation formula. Assuming that there is a 64*64 operation array, a clock frequency of the operation array is 1 Ghz, and the maximum performance of the AI processor or the AI chip is calculated as 8T according to formula (1). Data in Table 1 is used as a reference, the operation efficiency is 37.5%, and the actual performance of the AI processor or the AI chip is calculated as 3T according to formula (2).

In the practical application of image recognition, 6T computing power is required to be used according to service requirements, two AI processors or AI processing chips are required to be used in the related art, but only one AI processor or AI processing chip is required in the technical solution of this disclosure.

In conclusion, in this technical solution, the performance and competitive strength of the chip are improved and the use costs of the chip are reduced.

Figure 9:
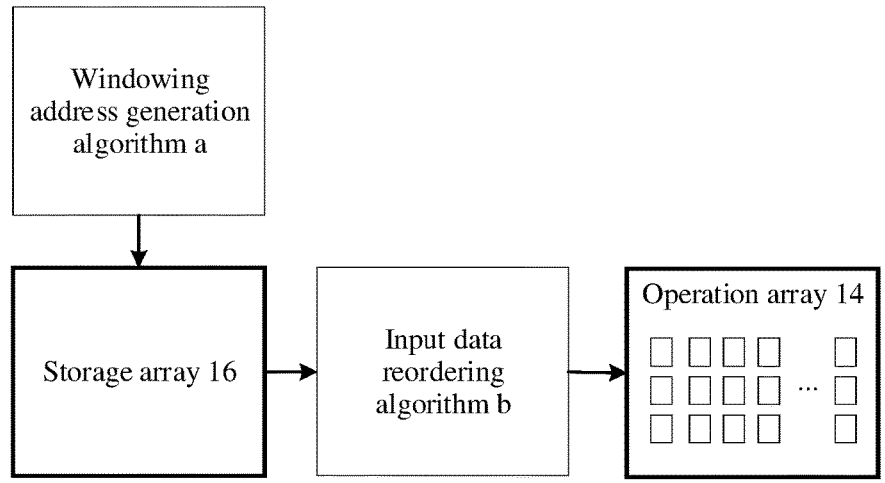
FIG. 9 is a flowchart of an operation method based on a chip having an operation array according to another exemplary embodiment of this disclosure.

In an embodiment based on FIG. 2, step 102 may be implemented by two parts of algorithm, as shown in FIG. 9.
1. Windowing Address Generation Algorithm a Storage addresses of K pieces of neuron data required by each operation clock in an operation array are determined according to a size (M*N*D) of the neural network model and a size (K*L) of the operation array. Therefore, the depth dimension of the neural network model is decoupled from the size of the operation array.

2. Input Data Reordering Algorithm b

Neuron data to be operated is read from a storage array 16 according to the storage addresses determined by using the windowing address generation algorithm a, and the neuron data to be operated is buffered to a depth plane register. In each operation clock, the K pieces of neuron data required by a clock i is reordered by using the input data reordering algorithm b, and then inputted to K rows of operation units of an operation array 14, thereby implementing decoupling the length and width dimensions of the neural network model from the size of the operation array.

Figure 10:
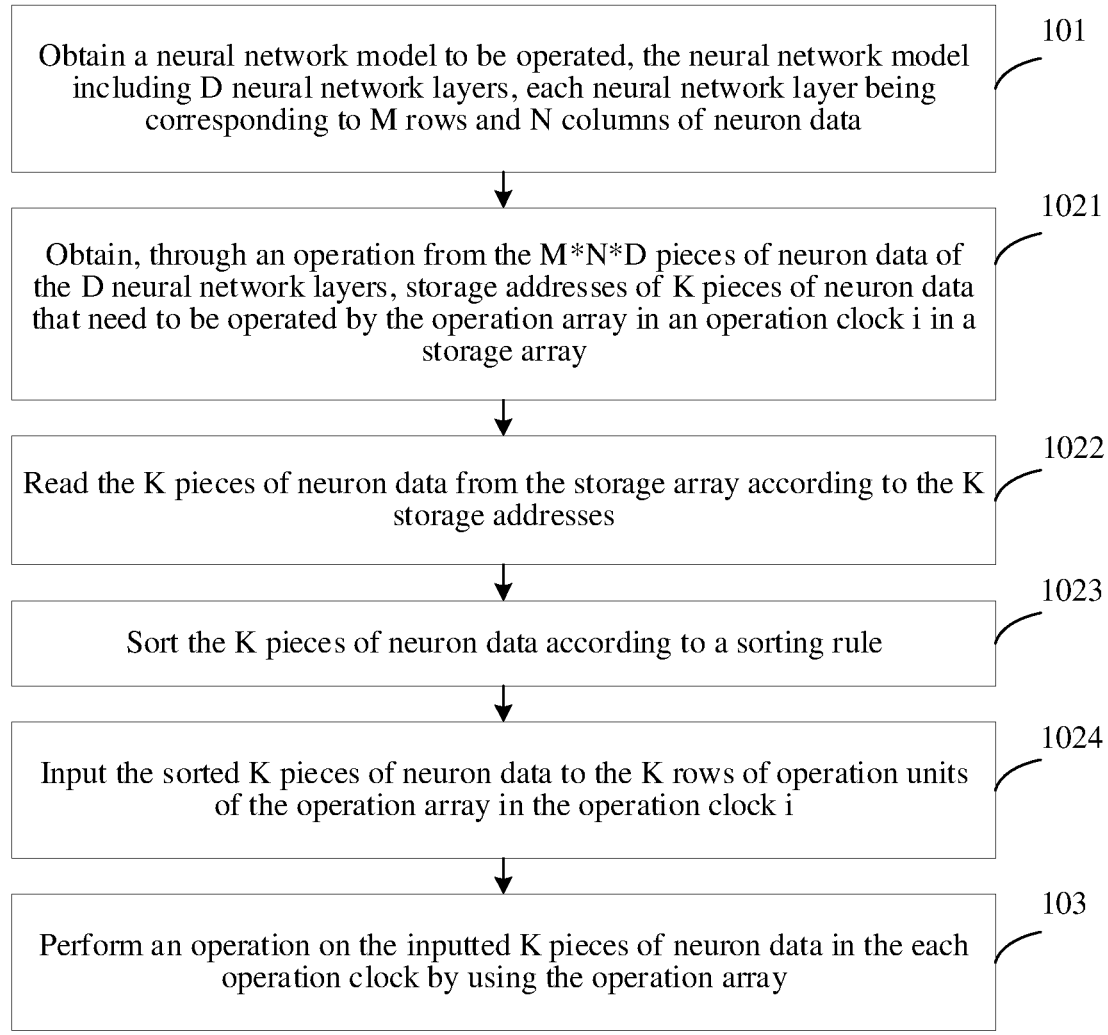
FIG. 10 is a flowchart of an operation method based on a chip having an operation array according to another exemplary embodiment of this disclosure.

In this embodiment, step 102 may be replaced with steps 1021 to 1024. Referring to FIG. 10, the implementation of mapping the M*N*D pieces of neuron data of the D neural network layers to the K rows of operation units is as follows.

Step 1021. Obtain, through an operation from the M*N*D pieces of neuron data of the D neural network layers, storage addresses of K pieces of neuron data that need to be operated by the operation array in an operation clock i in a storage array.

The terminal obtains, through an operation according to the windowing address generation algorithm from the M*N*D pieces of neuron data of the D neural network layers, storage addresses of K pieces of neuron data that need to be operated by the operation array in an operation clock i in a storage array, and records an offset of each piece of neuron data and a dimension of a neural network layer in which the each piece of neuron data is located, i being an integer.

Step 1022. Read the K pieces of neuron data from the storage array according to the K storage addresses.

The terminal reads the K pieces of neuron data from the D neural network layers in the storage array according to the K storage addresses and stores the K pieces of neuron data in a depth plane register of an on-chip storage unit array.

The depth plane register is a high-speed storage component with a storage capacity, and may be configured to temporarily store instructions, data, and addresses. In this embodiment, the depth plane register is configured to temporarily store neuron data to be operated. The terminal temporarily stores the K pieces of neuron data read from the storage array according to the K storage addresses in the depth plane register, and sends the K pieces of neuron data temporarily stored in the depth plane register to the operation array in the clock i for operation.

Step 1023. Sort the K pieces of neuron data according to a sorting rule.

The terminal outputs the K pieces of neuron data in the depth plane register according to a sorting rule according to the input data reordering algorithm.

The sorting rule includes but is not limited to any one of the following rules.

That different layers are sorted alternately is a first sorting priority, and that the same layer is sorted according to a row-column position order is a second sorting priority.

The K pieces of neuron data are preferably sorted according to an order in which neuron data from different neural network layers appears in a polling manner in ascending order (or descending order) of layer numbers; and then neuron data from the same neural network layer is sorted according to the row-column position order.

That the same layer is sorted according to a row-column position order is a first sorting priority, and that different layers are sorted alternately is a second sorting priority.

The K pieces of neuron data are preferably sorted according to the row-column position order of the neuron data from the same neural network layer; and then the neuron data from different neural network layers is sorted in ascending order (or descending order) of layer numbers.

Step 1024. Input the sorted K pieces of neuron data to the K rows of operation units of the operation array in the operation clock i.

Based on the foregoing, according to the operation method based on a chip having an operation array provided in this embodiment, a neural network model to be operated is obtained, the neural network model including D neural network layers, each neural network layer including M*N pieces of neuron data; K pieces of neuron data to be operated corresponding to each operation clock are determined from M*N*D pieces of neuron data of the D neural network layers and inputted to K rows of operation units of an operation array; and an operation is performed on the inputted K pieces of neuron data in the each operation clock by the operation array. According to the method, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array, and playing the operation performance of the operation array more efficiently.

The terminal reads the K pieces of neuron data from the storage array according to the storage addresses, and then sorts the K pieces of neuron data according to a sorting rule. The sorting rule may include any one of the following two rules.

That different layers are sorted alternately is a first sorting priority, and that the same layer is sorted according to a row-column position order is a second sorting priority.

The K pieces of neuron data are preferably sorted according to an order in which neuron data from different neural network layers appears in a polling manner in ascending order (or descending order) of layer numbers; and then neuron data from the same neural network layer is sorted according to the row-column position order.

That the same layer is sorted according to a row-column position order is a first sorting priority, and that different layers are sorted alternately is a second sorting priority.

The K pieces of neuron data are preferably sorted according to the row-column position order of the neuron data from the same neural network layer; and then the neuron data from different neural network layers is sorted in ascending order (or descending order) of layer numbers.

Schematically, the row-column position order includes the following four types:

- an order row-wise from left to right and column-wise from top to bottom;
- an order row-wise from left to right and column-wise from bottom to top;
- an order row-wise from right to left and column-wise from top to bottom; and
- an order row-wise from right to left and column-wise from bottom to top.

Figure 11:
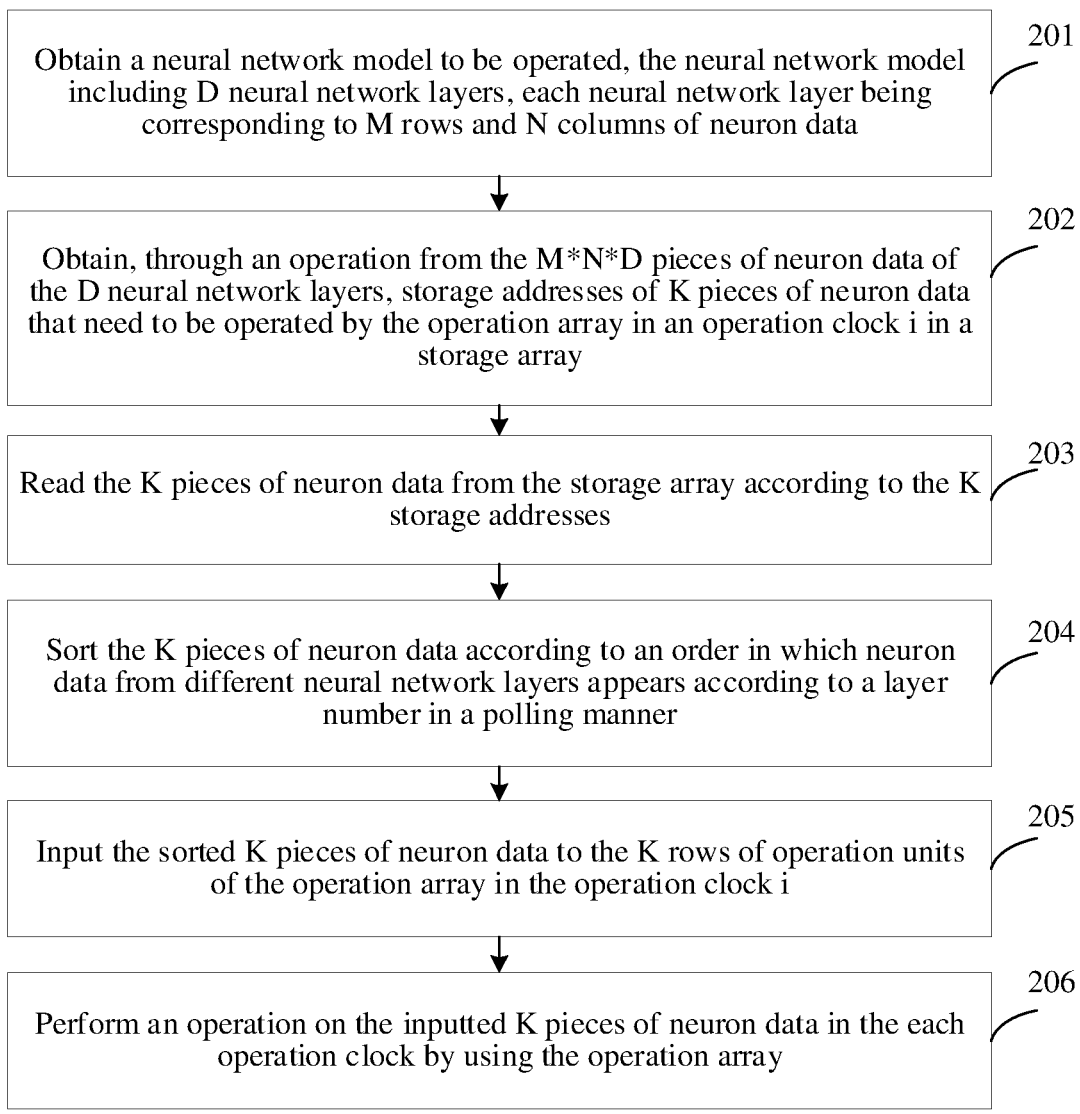
FIG. 11 is a flowchart of an operation method based on a chip having an operation array according to another exemplary embodiment of this disclosure.
Figure 15:
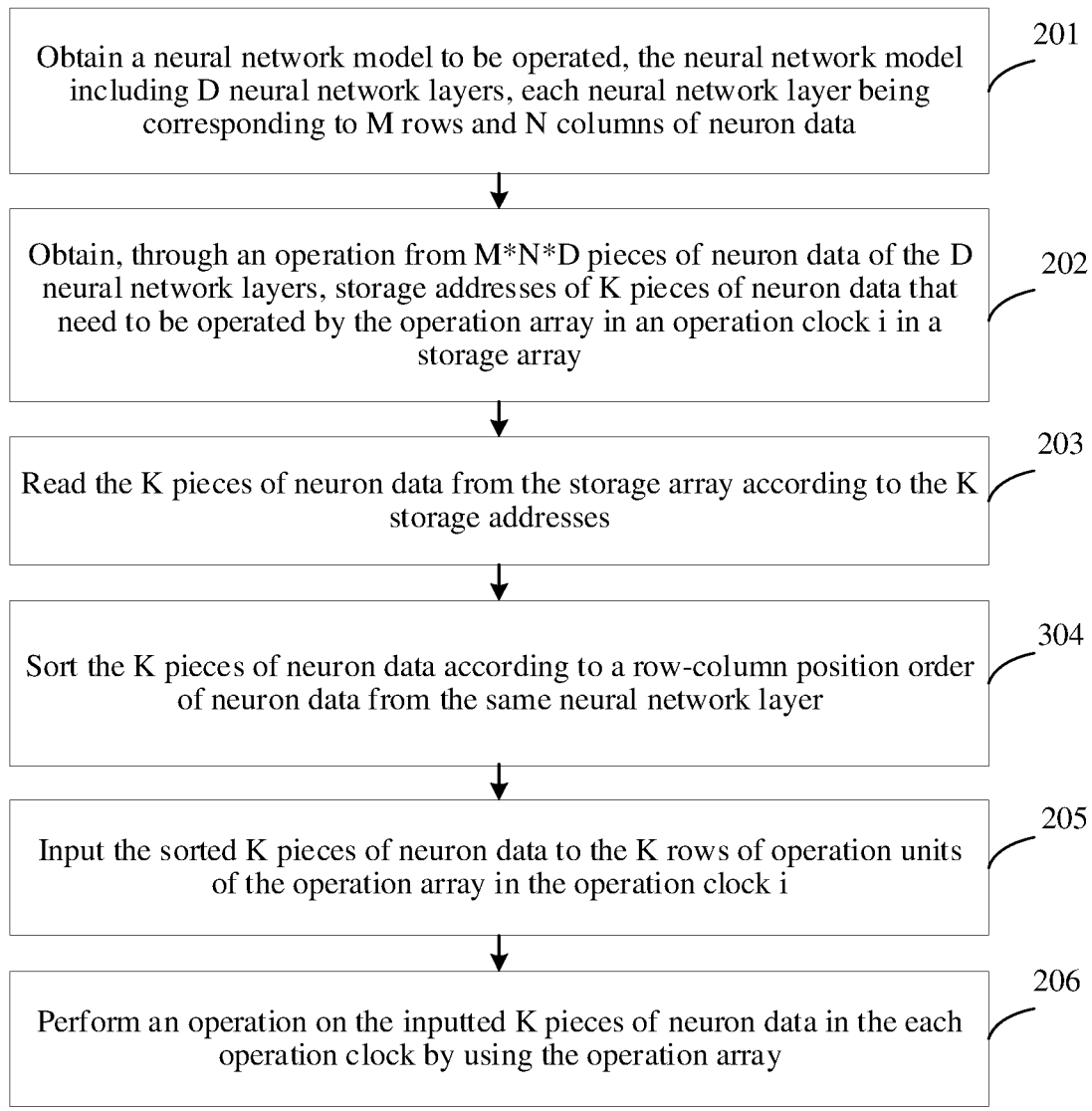
FIG. 15 is a flowchart of an operation method based on a chip having an operation array according to another exemplary embodiment of this disclosure.

In the following embodiments, FIG. 11 is a description of a first sorting manner; and FIG. 15 is a description of a second sorting manner.

FIG. 11 is a flowchart of an operation method based on a chip having an operation array according to another exemplary embodiment of this disclosure, applicable to the chip having an operation array, the operation array includes K rows of operation units, and the method includes the following steps.

Step 201. Obtain a neural network model to be operated, the neural network model including D neural network layers, each neural network layer being corresponding to M rows and N columns of neuron data.

The terminal obtains a neural network model to be operated, the neural network model includes an M*N*D neural network model, the neural network model includes D M*N neural network layers, and each neural network layer corresponds to M rows and N columns of neuron data.

Step 202. Obtain, through an operation from M*N*D pieces of neuron data of the D neural network layers, storage addresses of K pieces of neuron data that need to be operated by the operation array in an operation clock i in a storage array.

The D M*N neural network layers are stored in a storage array, and an operation array of K rows and L columns in the terminal includes K rows of operation units. The terminal obtains, through an operation from the M*N*D pieces of neuron data of the D neural network layers, storage addresses of K pieces of neuron data required for the operation array in an operation clock i in a storage array, and records an offset of each piece of neuron data and a dimension of a neural network layer in which the each piece of neuron data is located.

Step 203. Read the K pieces of neuron data from the storage array according to the K storage addresses.

The terminal reads the K pieces of neuron data from the storage array according to the K storage addresses and stores the K pieces of neuron data in a depth plane register.

In an embodiment, the terminal obtains, through the operation in a clock i, a quantity k of pieces of neuron data that needs to be read from each neural network layer, reads k pieces of neuron data from each neural network layer in a storage array according to D*k storage addresses, and temporarily stores D*k pieces of neuron data in a corresponding depth plane register, k being a positive integer, D*k being less than or equal to k.

Schematically, a 3*3*3 neural network model is mapped to an 8*8 operation array, and the operation array needs to operate eight pieces of neuron data in each clock. Therefore, the operation array correspondingly needs to read three pieces of neuron data to be operated, three pieces of neuron data to be operated, and two pieces of neuron data to be operated from neural network layers in a storage array, and temporarily stores the neuron data read from different neural network layers in corresponding depth plane registers of the neural network layers respectively.

Figure 13:
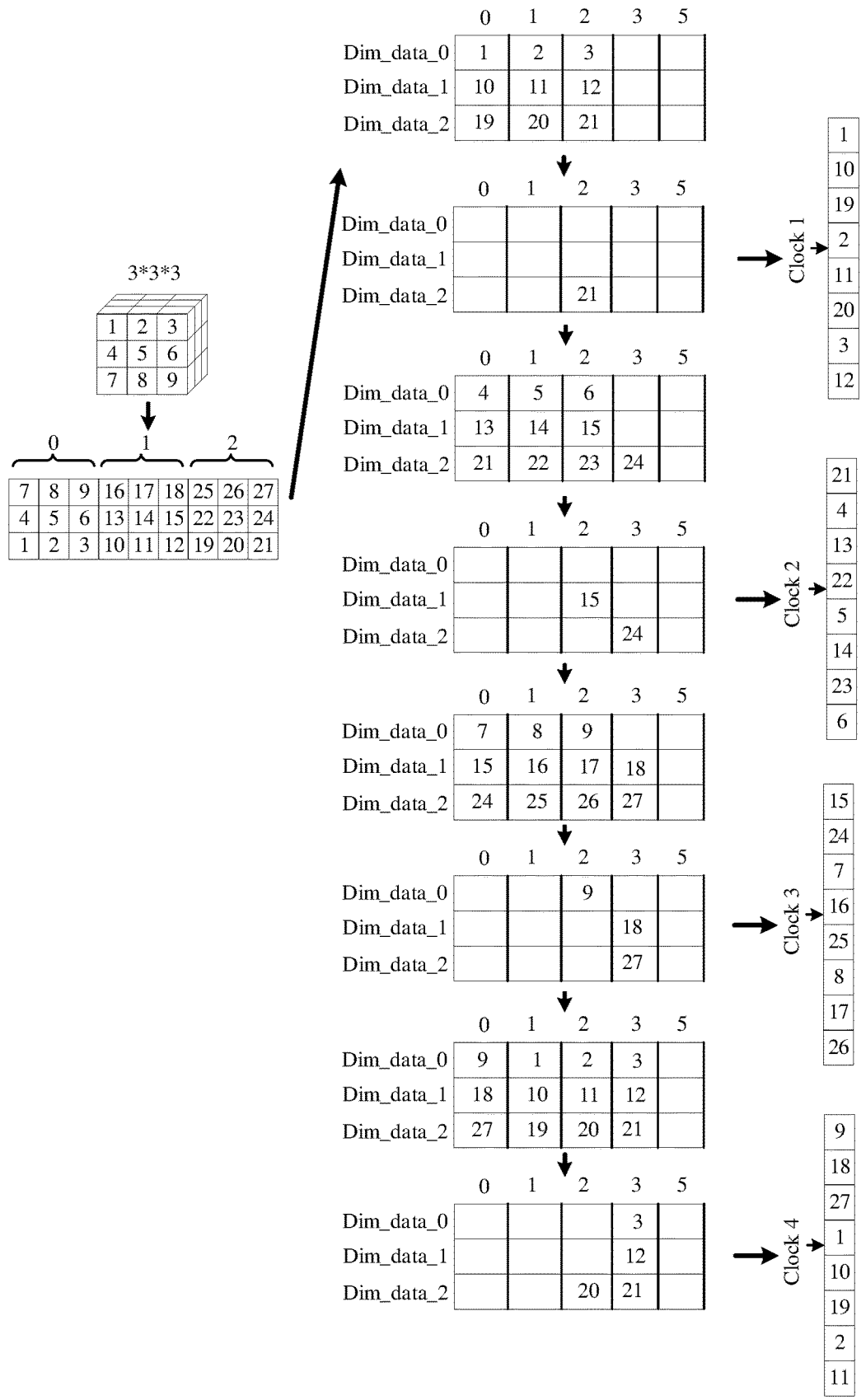
FIG. 13 is a schematic diagram of an operation method based on a chip having an operation array according to another exemplary embodiment of this disclosure.

For example, as shown in FIG. 13, an operation array needs to operate eight pieces of neuron data in each clock. The terminal reads three pieces of neuron data to be operated from each of neural network layers 0 to 2 to be temporarily stored in the depth plane register, that is, the terminal reads neuron data 1, 2, and 3 from the neural network layer 0 to be temporarily stored in a depth plane register Dim_data_0, reads neuron data 10, 11, and 12 from the neural network layer 1 to be temporarily stored in a depth plane register Dim_data_1, and reads neuron data 19, 20, and 21 from the neural network layer 2 to be temporarily stored in a depth plane register Dim_data_2.

Step 204. Sort the K pieces of neuron data according to an order in which neuron data from different neural network layers appears according to a layer number in a polling manner.

In an embodiment, the terminal sorts the K pieces of neuron data according to an order in which neuron data from different neural network layers appears in ascending order of layer numbers in a polling manner, or sorts the K pieces of neuron data according to an order in which neuron data from different neural network layers appears in descending order of layer numbers in a polling manner.

Schematically, description is made by using an example in which the terminal sorts the K pieces of neuron data according to the order in which the neuron data from different neural network layers appears in ascending order of the layer numbers in the polling manner.

Figure 12:
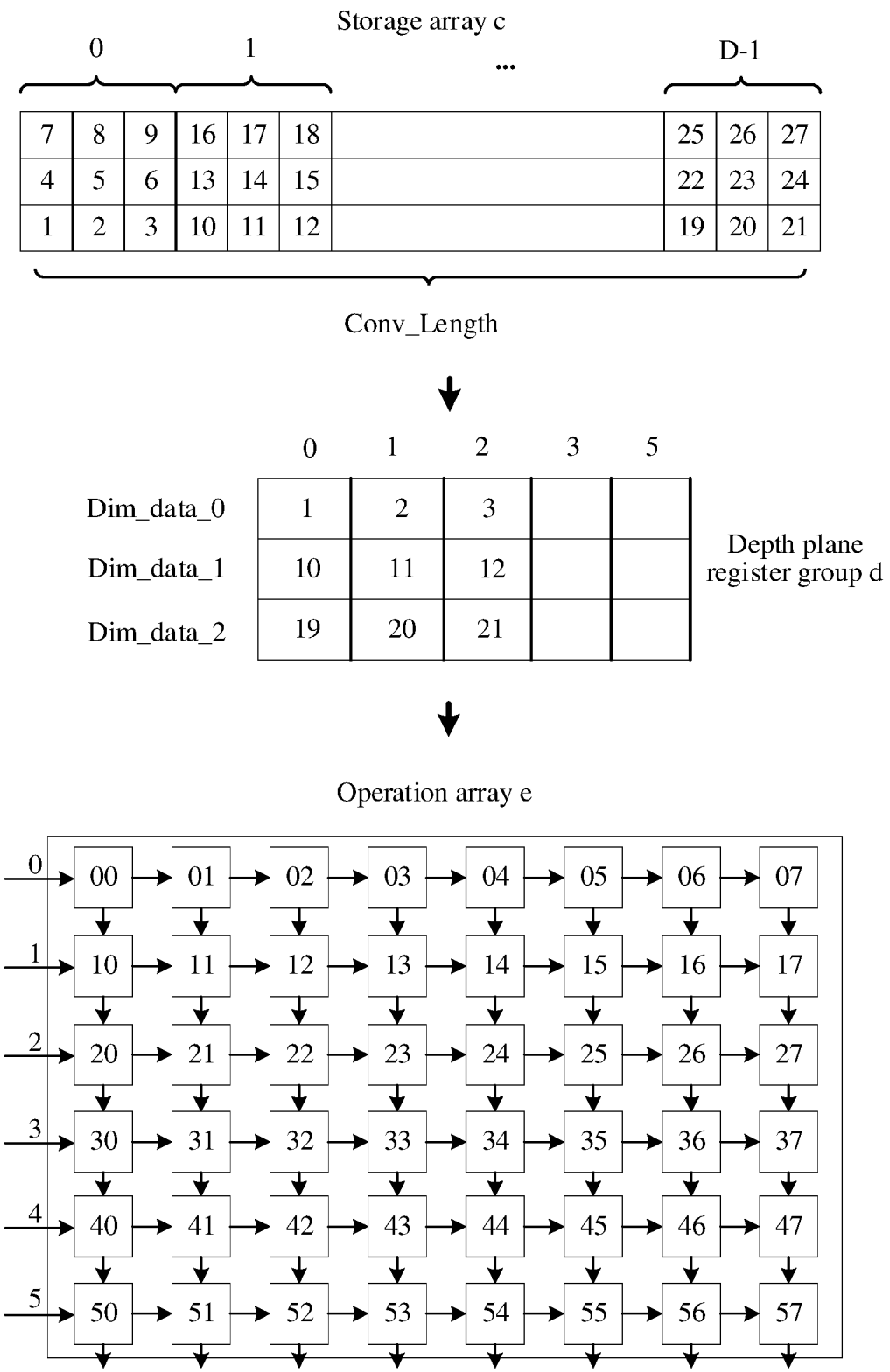
FIG. 12 is a schematic diagram of an operation method based on a chip having an operation array according to another exemplary embodiment of this disclosure.

Referring to FIG. 12, neuron data of an M*N*D neural network model is stored in a storage array c, the neural network model is divided into D neural network layers according to a dimension D, neural network layers 0 to (D−1) are sequentially stored in the storage array c, and a location of each piece of neuron data stored in the storage array c corresponds to a storage address. For example, a storage address of neuron data "1" in the storage array c is 0, and sequentially, a storage address of neuron data "2" is increased by one based on the storage address of the neuron data "1". Therefore, the storage address of the neuron data "2" is 1, a storage address of neuron data "3" is 2, and so on. When a storage length of the storage array c is Conv_Length, the (Conv_Length)$^{th}$ storage address is Conv_Length−1; this row is used as a first row of the storage array c, a storage address of a first column of a second row is Conv_Length, and so on.

The terminal reads the neuron data in the storage array c according to the storage address. After the neuron data "3" is read at a location in which the storage address is 2, neuron data "4" needs to be read. A jump is required due to inconsecutive storage addresses of the neuron data "4" and the neuron data "3", and a jump address of the neuron data "4" is read as Conv_Length−1 according to the inference of the storage address.

After completing the windowing address generation algorithm in the storage array c and reading the neuron data in the storage array c, the terminal temporarily stores the neuron data in a depth plane register group d. In this embodiment of this disclosure, each neural network layer corresponds to a depth plane register. The depth plane register group d is a high-speed storage component with a limited storage capacity. Because an intermediate temporary storage process is required when the neuron data to be operated needs to be reordered, the intermediate temporary storage process of the neuron data is implemented by using the depth plane register group d in this embodiment.

After reading the neuron data to be operated to the depth plane register group d, the terminal inputs the neuron data to be operated to an operation array e according to the input data reordering algorithm for operation.

Specifically, referring to FIG. 13, a 3*3*3 neural network model is mapped to an operation array of eight rows, and the 3*3*3 neural network model includes a neural network layer 0, a neural network layer 1, and a neural network layer 2. It can be seen through an operation that three pieces of neuron data need to be obtained from each neural network layer.

Eight pieces of neuron data required by a clock 1 are read from a storage array. First, neuron data 1, 2, and 3 obtained from the neural network layer 0 are scheduled to a depth plane register Dim_data_0, neuron data 10, 11, and 12 obtained from the neural network layer 1 are scheduled to a depth plane register Dim_data_1, and neuron data 19, 20, and 21 obtained from the neural network layer 2 are scheduled to a depth plane register Dim_data_2.

Subsequently, the eight pieces of neuron data to be operated of the clock 1 are sorted. Operation units of a row 0 of an operation array correspond to the neuron data 1 with an offset being zero in the Dim_data_0, operation units of a row 1 of the operation array correspond to the neuron data 10 with the offset being zero in the Dim_data_1, operation units of a row 2 of the operation array correspond to the neuron data 19 with the offset being zero in the Dim_data_2, operation units of a row 3 of the operation array correspond to the neuron data 2 with the offset being one in the Dim_data_0, operation units of a row 4 of the operation array correspond to the neuron data 11 with the offset being one in the Dim_data_1, operation units of a row 5 of the operation array correspond to the neuron data 20 with the offset being one in the Dim_data_2, operation units of a row 6 of the operation array correspond to the neuron data 3 with the offset being two in the Dim_data_0, and operation units of a row 7 of the operation array correspond to the neuron data 12 with the offset being two in the Dim_data_1. Sorting is performed according to the corresponding order, and the neuron data 1, 10, 19, 2, 11, 20, 3, and 12 are correspondingly inputted into the operation units of the rows 0 to 7 of the operation array in the clock 1.

After the round of operation of the neuron data is outputted, the operated data is moved out and the currently operated neural network layer is recorded as the neural network layer 1. The neuron data 21 with the offset being two remains in the depth plane register Dim_data_2, and neuron data to be operated is re-read. Neuron data 4, 5, and 6 obtained from the neural network layer 0 are scheduled to the depth plane register Dim_data_0, neuron data 13, 14, and 15 obtained from the neural network layer 1 are scheduled to the depth plane register Dim_data_1, and neuron data 22, 23, and 24 obtained from the neural network layer 2 are scheduled to the depth plane register Dim_data_2.

Then, an offset of the neuron data in the depth plane register is updated, the offset of the neuron data 21 is updated as 0, and the offsets of the neuron data 22, 23, and 24 are 1, 2, and 3 in sequence. A currently operated neural network layer is recorded as 1, polling is started from a neural network layer 2, and eight pieces of neuron data to be operated of a clock 2 are sorted. Operation units of a row 0 of an operation array correspond to the neuron data 21 with the offset being zero in the Dim_data_2, operation units of a row 1 of the operation array correspond to the neuron data 4 with the offset being zero in the Dim_data_0, operation units of a row 2 of the operation array correspond to the neuron data 13 with the offset being zero in the Dim_data_1, operation units of a row 3 of the operation array correspond to the neuron data 22 with the offset being one in the Dim_data_2, operation units of a row 4 of the operation array correspond to the neuron data 5 with the offset being one in the Dim_data_0, operation units of a row 5 of the operation array correspond to the neuron data 14 with the offset being one in the Dim_data_1, operation units of a row 6 of the operation array correspond to the neuron data 6 with the offset being two in the Dim_data_2, and operation units of a row 7 of the operation array correspond to the neuron data 15 with the offset being two in the Dim_data_0. Sorting is performed according to the corresponding order, and the neuron data 21, 4, 13, 22, 5, 14, 23, and 6 are correspondingly inputted into the operation units of the rows 0 to 7 of the operation array in the clock 2.

After the two rounds of operations of the neuron data are outputted, the operated data is moved out and the currently operated neural network layer is recorded as the neural network layer 0. The neuron data 15 with the offset being two remains in the depth plane register Dim_data_1, the neuron data 24 with the offset being three remains in the depth plane register Dim_data_2, and neuron data to be operated is re-read. Neuron data 7, 8, and 9 obtained from the neural network layer 0 are scheduled to the depth plane register Dim_data_0, neuron data 16, 17, and 18 obtained from the neural network layer 1 are scheduled to the depth plane register Dim_data_1, and neuron data 25, 26, and 27 obtained from the neural network layer 2 are scheduled to the depth plane register Dim_data_2.

Then, an offset of the neuron data in the depth plane register is updated, the offset of the neuron data 15 is updated as 0, and the offsets of the neuron data 16, 17, and 18 are 1, 2, and 3 in sequence. The offset of the neuron data 24 is updated as 0, and the offsets of the neuron data 25, 26, and 27 are 1, 2, and 3 in sequence. A currently operated neural network layer is recorded as 0, polling is started from a neural network layer 1, and eight pieces of neuron data to be operated of a clock 3 are sorted. Operation units of a row 0 of an operation array correspond to the neuron data 15 with the offset being zero in the Dim_data_1, operation units of a row 1 of the operation array correspond to the neuron data 24 with the offset being zero in the Dim_data_2, operation units of a row 2 of the operation array correspond to the neuron data 7 with the offset being zero in the Dim_data_0, operation units of a row 3 of the operation array correspond to the neuron data 16 with the offset being one in the Dim_data_1, operation units of a row 4 of the operation array correspond to the neuron data 25 with the offset being one in the Dim_data_2, operation units of a row 5 of the operation array correspond to the neuron data 8 with the offset being one in the Dim_data_0, operation units of a row 6 of the operation array correspond to the neuron data 17 with the offset being two in the Dim_data_1, and operation units of a row 7 of the operation array correspond to the neuron data 26 with the offset being two in the Dim_data_2. Sorting is performed according to the corresponding order, and the neuron data 15, 24, 7, 16, 25, 8, 17, and 26 are correspondingly inputted into the operation units of the rows 0 to 7 of the operation array in the clock 3.

After the three rounds of operations of the neuron data are outputted, the operated data is moved out and the currently operated neural network layer is recorded as the neural network layer 2. The neuron data 9 with the offset being two remains in the depth plane register Dim_data_0, the neuron data 18 with the offset being three remains in the depth plane register Dim_data_1, and the neuron data 27 with the offset being three remains in the depth plane register Dim_data_2. There are 27 pieces of neuron data in the neural network model in total, after the three rounds of the neuron data are outputted, three pieces of data are remaining and are less than eight, and neuron data to be operated is read from another data cube of the neural network model for supplement. Neuron data 1, 2, and 3 obtained from the neural network layer 0 are scheduled to the depth plane register Dim_data_0, neuron data 10, 11, and 12 obtained from the neural network layer 1 are scheduled to the depth plane register Dim_data_1, and neuron data 19, 20, and 21 obtained from the neural network layer 2 are scheduled to the depth plane register Dim_data_2.

Then, an offset of the neuron data in the depth plane register is updated, the offset of the neuron data 9 is updated as 0, and the offsets of the neuron data 1, 2, and 3 are 1, 2, and 3 in sequence. The offset of the neuron data 18 is updated as 0, and the offsets of the neuron data 10, 11, and 12 are 1, 2, and 3 in sequence. The offset of the neuron data 27 is updated as 0, and the offsets of the neuron data 19, 20, and 21 are 1, 2, and 3 in sequence. A currently operated neural network layer is recorded as 2, polling is started from a neural network layer 0, and eight pieces of neuron data to be operated of a clock 4 are sorted. Operation units of a row 0 of an operation array correspond to the neuron data 9 with the offset being zero in the Dim_data_0, operation units of a row 1 of the operation array correspond to the neuron data 18 with the offset being zero in the Dim_data_1, operation units of a row 2 of the operation array correspond to the neuron data 27 with the offset being zero in the Dim_data_2, operation units of a row 3 of the operation array correspond to the neuron data 1 with the offset being one in the Dim_data_0, operation units of a row 4 of the operation array correspond to the neuron data 10 with the offset being one in the Dim_data_1, operation units of a row 5 of the operation array correspond to the neuron data 19 with the offset being one in the Dim_data_2, operation units of a row 6 of the operation array correspond to the neuron data 2 with the offset being two in the Dim_data_0, and operation units of a row 7 of the operation array correspond to the neuron data 11 with the offset being two in the Dim_data_1. Sorting is performed according to the corresponding order, and the neuron data 9, 18, 27, 1, 10, 19, 2, and 11 are correspondingly inputted into the operation units of the rows 0 to 7 of the operation array in the clock 4. After the four rounds of operations are performed, the operation of a neural network model is completed.

Step 205. Input the sorted K pieces of neuron data to the K rows of operation units of the operation array in the operation clock i.

The terminal inputs the sorted K pieces of neuron data to the K rows of operation units of the operation array in the operation clock i.

Step 206. Perform an operation on the inputted K pieces of neuron data in the each operation clock by using the operation array.

The terminal performs an operation on the inputted K pieces of neuron data in the each operation clock by using the operation array.

Based on the foregoing, according to the operation method based on a chip having an operation array provided in this embodiment, a neural network model to be operated is obtained, the neural network model including D neural network layers, each neural network layer including M*N pieces of neuron data; K pieces of neuron data to be operated corresponding to each operation clock are determined from M*N*D pieces of neuron data of the D neural network layers and inputted to K rows of operation units of an operation array. According to the method, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array.

In addition, in this solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

Figure 14:
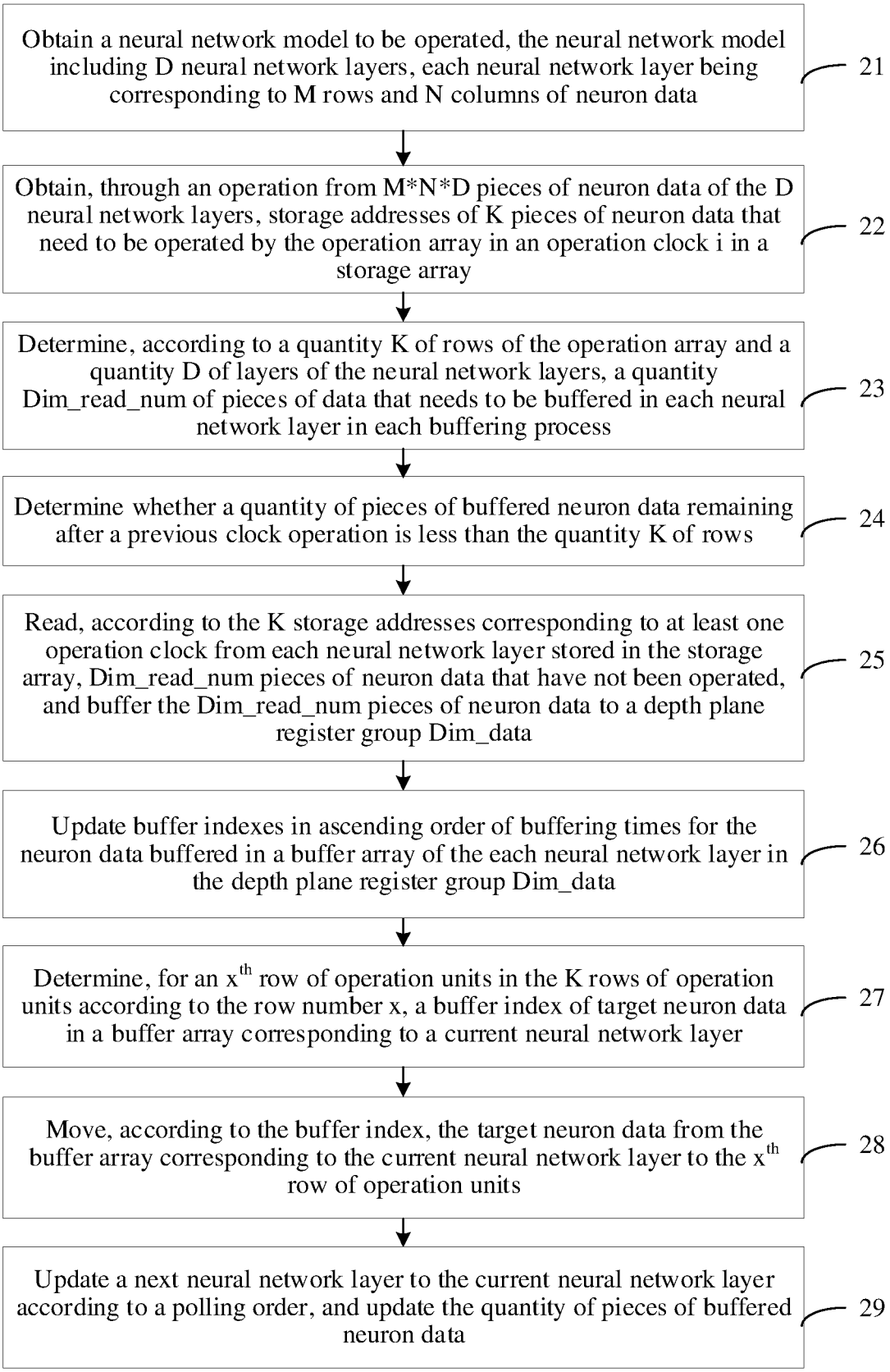
FIG. 14 is a flowchart of an operation method based on a chip having an operation array according to another exemplary embodiment of this disclosure.

Referring to FIG. 14, an implementation process of programs of the technical solution is described by using an example in which that the terminal sorts the K pieces of neuron data according to the order in which the neuron data from different neural network layers appears in ascending order of the layer numbers in the polling manner is the first sorting priority, and steps are as follows.

Step 21. Obtain a neural network model to be operated, the neural network model including D neural network layers, each neural network layer being corresponding to M rows and N columns of neuron data.

Refer to step 201, and details are not described herein again.

Step 22. Obtain, through an operation from M*N*D pieces of neuron data of the D neural network layers, storage addresses of K pieces of neuron data required for the operation array in an operation clock i in a storage array.

The terminal obtains, through an operation by using the windowing address generation algorithm, storage addresses of K pieces of neuron data required for the operation array in an operation clock i in a storage array.

data_num=K;//a quantity of pieces of data sent to an operation array each time is equal to a quantity K of rows;
Current_Dimension=0;//a dimension of current neuron data;
Current_Offset=0;//an offset of the current neuron data;
For(i=0;i<K;i++)//i=0, when i is less than K, i+1 each cycle;
　Generate_RamAddr_line(i,Current_Dimension,Current_Offset,M);//Generate_RamAddr_line function generates storage addresses of K pieces of neuron data in a storage array, and a dimension and an offset of each piece of neuron data are recorded;
Jump_Addr=Start_Addr;//a storage address of the first piece of neuron data in the first neural network layer;
If(Current_Offset<M){//if the offset of the neuron data is less than M, M being a length of the neural network model;
　Jump_Addr=Jump_Addr;//the address of the neuron data is unchanged; and
　Current_Offset=Current_Offset+1;//the offset of the neuron data is increased by one;
}
else{
　Jump_Addr=Jump_Addr+Conv_Length−M;//otherwise, the address of the neuron data is obtained by adding one image length to the current address and subtracting a length of the neural network model; and
Current_Offset=0;//the offset of the current neuron data is reassigned to 0;
}
after obtaining the storage address of the each piece of neuron data according to the windowing address generation algorithm, the terminal reads the neuron data to be operated from the storage array by using the input data reordering algorithm, and sends the neuron data to the K rows of operation units of the operation array, as shown in steps 23 to 29.

Step 23. Determine, according to a quantity K of rows of the operation array and a quantity D of layers of the neural network layers, a quantity Dim_read_num of pieces of data that needs to be buffered in each neural network layer in each buffering process.

First, the terminal records a data volume of the neuron data read from each neural network layer, and a data volume of the neuron data read from the $i^{th}$ neural network layer is represented as Dim_data_num[i], Total_left_data=Dim_data_num[0]+Dim_data_num[1]+Dim_data_num[2]+ ... +Dim_data_num[D−1];//a data volume of the neuron data read from D neural network layers.

Then, the terminal obtains, through an operation, a data volume of the neuron data that needs to be read from each neural network layer of the D neural network layers, and determines, when a remainder of dividing the quantity K of rows by the quantity D of layers is 0, a quotient of the quantity K of rows and the quantity D of layers as the quantity Dim_read_num of pieces of data that needs to be buffered in the each neural network layer in the each buffering process; and adds, when the remainder of dividing the quantity K of rows by the quantity D of layers is not 0, one to the quotient of the quantity K of rows and the quantity D of layers to obtain the quantity Dim_read_num of pieces of data that needs to be buffered in the each neural network layer in the each buffering process, If (K % D==0)//if a remainder of dividing K by D is equal to 0;
  Dim_read_num=K/D;//a data volume of the neuron data that needs to be read from each neural network layer of the D neural network layers is a quotient of K divided by D;
else{
Dim_read_num=K/D+1;//otherwise, the quotient of K divided by D plus one.

Step 24. Determine whether a quantity of pieces of buffered neuron data remaining after a previous clock operation is less than the quantity K of rows.

When the terminal determines that a quantity of pieces of buffered neuron data remaining after a previous clock operation is less than the quantity K of rows, step 25 is performed.

Step 25. Read, according to the K storage addresses corresponding to at least one operation clock from each neural network layer stored in the storage array, Dim_read_num pieces of neuron data that have not been operated, and buffer the Dim_read_num pieces of neuron data to a depth plane register group Dim_data.

The at least one operation clock includes the operation clock i, or the operation clock i and an adjacent clock of the operation clock i. The buffered neuron data remaining after the previous clock operation and the D*Dim_read_num pieces of neuron data buffered currently include the K pieces of neuron data required by the operation clock i.

Schematically, programming languages corresponding to step 24 and step 25 are as follows:
If(Total_store_data<K)//if a data volume of neuron data in a depth plane register is less than a quantity K of rows of an operation array;
{
For(i=0;i<K;i++){//i is increased by one from zero in each cycle, until K−1;
  Get_Data_From_Dim(i);//neuron data is obtained from the $i^{th}$ neural network layer;
  Dim_data_num[i]=Dim_data_num[i]+Dim_read_num;//a data volume of neuron data obtained from each neural network layer is updated; and
  Push_Data_Dim(i,Dim_read_num);//the updated neuron data is stored in a depth plane register correspondingly;
}
each neural network layer corresponding to one depth plane register.

Step 26. Update buffer indexes in ascending order of buffering times for the neuron data buffered in a buffer array of each neural network layer in a depth plane register group Dim_data.

The depth plane register group Dim_data includes a buffer array corresponding to each neural network layer, and neuron data buffered in the buffer array corresponds to buffer indexes sorted in ascending order of buffering times. For example, neuron data 1 to 3 are read to the same buffer array in sequence and are sorted in ascending order of the buffering time, an index location of the neuron data 1 is 0, an index location of the neuron data 2 is 1, and an index location of the neuron data 3 is 2.

After one round of operation is performed, the neuron data 3 is not operated, the index location of the neuron data 3 in the buffer array is updated as 0, and a next round of operation is performed.

Step 27. Determine, for an $x^{th}$ row of operation units in the K rows of operation units according to the row number x, a buffer index of target neuron data in a buffer array corresponding to a current neural network layer.

The target neuron data is neuron data that needs to be operated by the $x^{th}$ row of operation units in the operation clock i, x being an integer not greater than K.

In an embodiment, the terminal determines, according to a remainder of dividing the quantity D of layers by the row number x, a buffer index of target neuron data in a buffer array corresponding to a current neural network layer.

Step 28. Move, according to the buffer index, the target neuron data from the buffer array corresponding to the current neural network layer to the $x^{th}$ row of operation units.

In the operation clock i, the terminal removes, according to buffer indexes, K pieces of target neuron data from the buffer array to the K rows of operation units. In the previous round of operation, a neural network layer in which the finally removed neuron data is located is recorded, and the terminal polls neural network layers in ascending order. When the neural network layer in which the finally removed neuron data is located is the j layer, the neuron data is removed from a buffer array corresponding to the $(j+1)^{th}$ neural network layer; and when the neural network layer in which the finally removed neuron data is located is the last layer, the neuron data is removed from a buffer array corresponding to the first neural network layer.

Step 29. Update a next neural network layer to the current neural network layer according to a polling order, and update the quantity of pieces of buffered neuron data.

The terminal updates, according to a polling order, a next neural network layer to a neural network layer in which neuron data that needs to be operated by a first row of operation units is located during a next round of operation.

A corresponding program corresponding to step 26 to step 29 is as follows:
For(row_num=0;row_num<K;row_num=row_num+1)
  {//1 is increased from a row 0 of operation units in each cycle;
  Index=row_num/D;//an index location is a quotient of dividing an operation array by a quantity of neural network layers, and the index location indicates a corresponding buffer array of the $i^{th}$ neural network layer in a depth plane register;
  Row_data[row_num]=Dim_Data(index);//neuron data to be operated corresponding to row_num is obtained from a location indicated by an index;

Shift_Dim_data(i);//operated data is shifted;
Dim_data_num[i]=Dim_data_num[i]−1;//a quantity of pieces of neuron data stored in the depth plane register by the $i^{th}$ neural network layer is decreased by one; and
Update_Current_Dimension;//a plane of a current neural network model is updated;
}
after the neuron data is read, the remaining neuron data from the previous round may be temporarily stored in the depth plane register, and the offset of the neuron data in the depth plane register needs to be updated,
For(i=0;i<D;i=i+1){//i is increased by one from 0 in each cycle, until D−1;
Push_Data_Dim(i, Dim_data_num[i]);//an offset of the neuron data in the depth plane register is updated;
}.

Based on the foregoing, according to the operation method based on a chip having an operation array provided in this embodiment, a neural network model to be operated is obtained, the neural network model including D neural network layers, each neural network layer including M*N pieces of neuron data; a storage address of each piece of neuron data in a storage array is generated according to a windowing address generation algorithm; K pieces of neuron data that need to be operated by an operation array in an operation clock i are read by using an input data reordering algorithm, and the K pieces of neuron data are sorted; and finally the sorted K pieces of neuron data are inputted to K rows of operation units for operation. According to the method, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array.

In addition, in this solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

Referring to FIG. 15, step 204 is replaced with step 304 to describe a second sorting manner, and the step is as follows.

Step 304. Sort the K pieces of neuron data according to a row-column position order of neuron data from the same neural network layer.

In some embodiments, the terminal sorts the K pieces of neuron data according to an order row-wise from left to right and column-wise from top to bottom of neuron data from the same neural network layer.

In some embodiments, the terminal sorts the K pieces of neuron data according to an order row-wise from left to right and column-wise from bottom to top of the neuron data from the same neural network layer.

In some embodiments, the terminal sorts the K pieces of neuron data according to an order row-wise from right to left and column-wise from top to bottom of the neuron data from the same neural network layer.

In some embodiments, the terminal sorts the K pieces of neuron data according to an order row-wise from right to left and column-wise from bottom to top of the neuron data from the same neural network layer.

When the K pieces of neuron data include neuron data of the $i^{th}$ neural network layer and neuron data of the $(i+1)^{th}$ neural network layer, the neuron data of the $(i+1)^{th}$ neural network layer is sorted after the neuron data of the $i^{th}$ neural network layer; or when the K pieces of neuron data include neuron data of the $i^{th}$ neural network layer and neuron data of the $(i+1)^{th}$ neural network layer, the neuron data of the $(i+1)^{th}$ neural network layer is sorted before the neuron data of the $i^{th}$ neural network layer.

Figure 16:
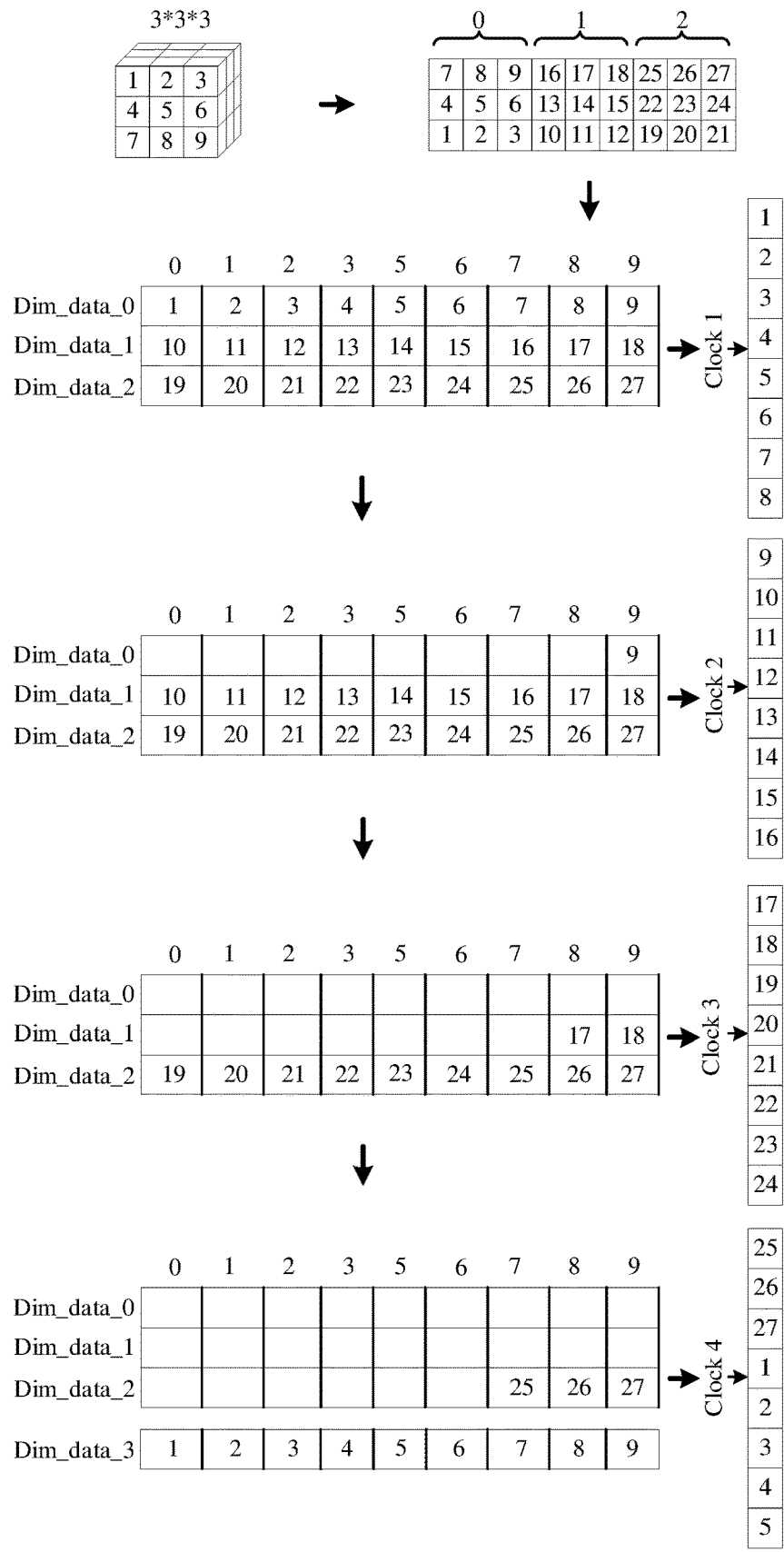
FIG. 16 is a schematic diagram of an operation method based on a chip having an operation array according to another exemplary embodiment of this disclosure.

For example, the terminal sorts the K pieces of neuron data according to an order from left to right and from top to bottom of the neuron data from the same neural network layer. Referring to FIG. 16, a 3*3*3 neural network model includes neural network layers 0 to 2, and the 3*3*3 neural network model is mapped to an operation array of eight rows. First, neuron data 1 to 9 in the neural network layer 0 are temporarily stored in the depth plane register Dim_data_0, neuron data 10 to 18 in the neural network layer 1 are temporarily stored in the depth plane register Dim_data_1, and neuron data 19 to 27 in the neural network layer 2 are temporarily stored in the depth plane register Dim_data_2; and eight pieces of neuron data required by a clock 1 are read, and the neuron data 1 to 8 arranged in an order from left to right and from top to bottom in the neural network layer 0 are read from the depth plane register Dim_data_0.

After the round of operation of the neuron data is outputted, eight pieces of neuron data required by a clock 2 are read. The neuron data 9 in the neural network layer 0 is read from the depth plane register Dim_data_0, the depth plane register Dim_data_1 is jumped to for continuing to read neuron data 10 to 16 sorted in the order from left to right and from top to bottom in the neural network layer 1, and the neuron data read in the neural network layer 1 is sorted after the neuron data read in the neural network layer 0.

After the two rounds of operations of the neuron data are outputted, eight pieces of neuron data required by a clock 3 are read. The neuron data 17 and 18 sorted in the order from left to right and from top to bottom in the neural network layer 1 are read from the depth plane register Dim_data_1, the depth plane register Dim_data_2 is jumped to for continuing to read neuron data 19 to 24 sorted in the order from left to right and from top to bottom in the neural network layer 2, and the neuron data read in the neural network layer 2 is sorted after the neuron data read in the neural network layer 1.

After the three rounds of operations of the neuron data are outputted, eight pieces of neuron data required by a clock 4 are read. In this case, three pieces of neuron data are remaining in the depth plane register Dim_data_2 and are less than eight. The terminal obtains neuron data 1 to 9 of the first neural network layer of another data cube of the neural network model and temporarily stores the neuron data 1 to 9 in a depth plane register Dim_data_3. Neuron data 25 to 27 sorted in the order from left to right and from top to bottom in the neural network layer 2 are read from the depth plane register Dim_data_2, the depth plane register Dim_data_3 is jumped to for continuing to read neuron data 1 to 5 sorted in the order from left to right and from top to bottom in the neural network layer 3, and the neuron data read in the neural network layer 3 is sorted after the neuron data read in the neural network layer 2. After the four rounds of operations are performed, the operation of a neural network model is completed.

Based on the foregoing, according to the operation method based on a chip having an operation array provided in this embodiment, a neural network model to be operated is obtained, the neural network model including D neural network layers, each neural network layer including M*N pieces of neuron data; K pieces of neuron data to be operated corresponding to each operation clock are determined from M*N*D pieces of neuron data of the D neural network layers and inputted to K rows of operation units of an operation array; and an operation is performed on the inputted K pieces of neuron data in the each operation clock by the operation array. According to the method, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array.

In addition, in this solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

Figure 17:
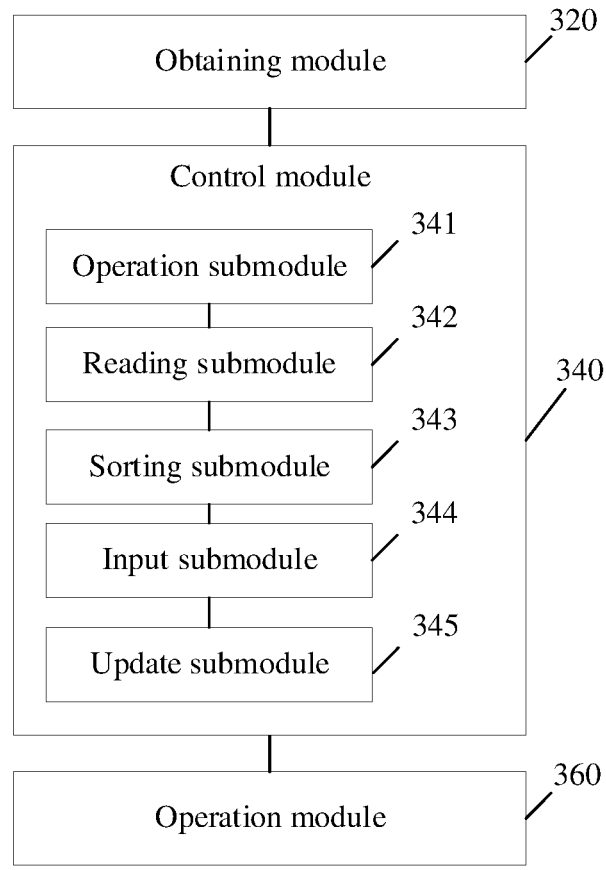
FIG. 17 is a block diagram of an operation apparatus based on a chip having an operation array according to an exemplary embodiment of this disclosure.

FIG. 17 is a block diagram of an operation apparatus based on a chip having an operation array according to an exemplary embodiment of this disclosure, the apparatus is connected to the operation array, the operation array includes K rows of operation units, and the apparatus includes:

- an obtaining module 320, configured to obtain a neural network model to be operated, the neural network model including D neural network layers, each neural network layer being corresponding to M rows and N columns of neuron data;
- a control module 340, configured to determine, from M*N*D pieces of neuron data of the D neural network layers, K pieces of neuron data to be operated corresponding to each operation clock, and input the K pieces of neuron data to be operated to the K rows of operation units of the operation array; and
- an operation module 360, configured to perform an operation on the inputted K pieces of neuron data in the each operation clock by using the operation array, M. N. D, and K all being positive integers.

In some embodiments, the control module 340 includes:
- an operation submodule 341, configured to obtain, through an operation from the M*N*D pieces of neuron data of the D neural network layers, storage addresses of K pieces of neuron data that need to be operated by the operation array in an operation clock i in a storage array;
- a reading submodule 342, configured to read the K pieces of neuron data from the storage array according to the K storage addresses;
- a sorting submodule 343, configured to sort the K pieces of neuron data according to a sorting rule, and for the sorting rule, reference is made to the description in the method embodiments; and
- an input submodule 344, configured to input the sorted K pieces of neuron data to the K rows of operation units of the operation array in the operation clock i.

In some embodiments, the reading submodule 342 is configured to determine, according to a quantity K of rows of the operation array and a quantity D of layers of the neural network layers, a quantity Dim_read_num of pieces of data that needs to be buffered in each neural network layer in each buffering process; determine whether a quantity of pieces of buffered neuron data remaining after a previous clock operation is less than the quantity K of rows; and when the quantity of pieces of buffered neuron data is less than the quantity K of rows, read, according to the K storage addresses corresponding to at least one operation clock from each neural network layer stored in the storage array, Dim_read_num pieces of neuron data that have not been operated, and buffer the Dim_read_num pieces of neuron data to a depth plane register group Dim_data; the buffered neuron data remaining after the previous clock operation and the D*Dim_read_num pieces of neuron data buffered currently including the K pieces of neuron data required by the operation clock i.

In some embodiments, the reading submodule 342 is further configured to determine, when a remainder of dividing the quantity K of rows by the quantity D of layers is 0, a quotient of the quantity K of rows and the quantity D of layers as the quantity Dim_read_num of pieces of data that needs to be buffered in the each neural network layer in the each buffering process; and add, when the remainder of dividing the quantity K of rows by the quantity D of layers is not 0, one to the quotient of the quantity K of rows and the quantity D of layers to obtain the quantity Dim_read_num of pieces of data that needs to be buffered in the each neural network layer in the each buffering process.

In some embodiments, the depth plane register group includes a buffer array corresponding to each neural network layer, and neuron data buffered in the buffer array corresponds to buffer indexes sorted in ascending order of buffering times.

The sorting submodule 343 is configured to determine, for an $x^{th}$ row of operation units in the K rows of operation units according to the row number x, a buffer index of target neuron data in a buffer array corresponding to a current neural network layer, the target neuron data being neuron data that needs to be operated by the $x^{th}$ row of operation units in the operation clock i, x being an integer not greater than K; move, according to the buffer index, the target neuron data from the buffer array corresponding to the current neural network layer to the $x^{th}$ row of operation units; and update a next neural network layer to the current neural network layer according to a polling order, and update the quantity of pieces of buffered neuron data.

In some embodiments, the sorting submodule 343 is further configured to determine, according to a remainder of dividing the quantity D of layers by the row number x, the buffer index of the target neuron data in the buffer array corresponding to the current neural network layer.

In some embodiments, the control module 340 further includes:
- an update submodule 345, configured to update the buffer indexes in ascending order of the buffering times for the neuron data buffered in the buffer array of the each neural network layer in the depth plane register group Dim_data.

Based on the foregoing, according to the operation apparatus based on a chip having an operation array provided in this embodiment, a neural network model to be operated is obtained, the neural network model including D neural network layers, each neural network layer including M*N pieces of neuron data; K pieces of neuron data to be operated corresponding to each operation clock are determined from M*N*D pieces of neuron data of the D neural network layers and inputted to K rows of operation units of an operation array. According to the apparatus, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array.

In addition, in this technical solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

Figure 18:
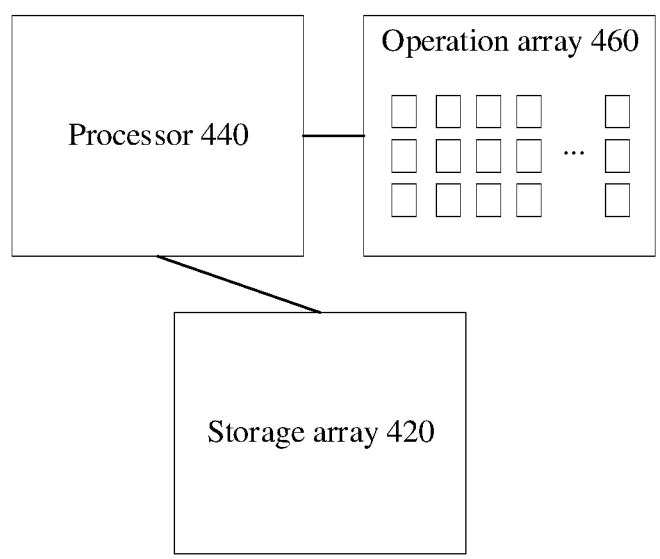
FIG. 18 is a schematic structural diagram of a computer device according to an exemplary embodiment of this disclosure.

FIG. 18 is a structural block diagram of a computer device according to an exemplary embodiment of this embodiment. When the method shown in FIG. 2 to FIG. 16 is implemented through software, the method is applicable to the computer device. The computer device is equipped with a chip having an operation array, and the chip includes a storage array 420, a processor 440, and an operation array 460.

The storage array 420 is configured to store a neural network model, the neural network model including D neural network layers, each neural network layer being corresponding to M rows and N columns of neuron data.

The processor 440 is configured to obtain the neural network model to be operated, determine, from M*N*D pieces of neuron data of the D neural network layers, K pieces of neuron data to be operated corresponding to each operation clock, and input the K pieces of neuron data to be operated to K rows of operation units of the operation array 460.

The operation array 460 is configured to perform an operation on the inputted K pieces of neuron data in the each operation clock by using the operation array 460, M, N, D, and K all being positive integers.

In some embodiments, the processor 440 is configured to obtain, through an operation from the M*N*D pieces of neuron data of the D neural network layers, storage addresses of K pieces of neuron data that need to be operated by the operation array 460 in an operation clock i in the storage array 420; read the K pieces of neuron data from the storage array 420 according to the K storage addresses; sort the K pieces of neuron data according to a sorting rule; and input the sorted K pieces of neuron data to the K rows of operation units of the operation array 460 in the operation clock i. For the sorting rule, reference is made to the description in the method embodiments.

In some embodiments, the processor 440 is configured to determine, according to a quantity K of rows of the operation array 460 and a quantity D of layers of the neural network layers, a quantity Dim_read_num of pieces of data that needs to be buffered in each neural network layer in each buffering process; determine whether a quantity of pieces of buffered neuron data remaining after a previous clock operation is less than the quantity K of rows; and when the quantity of pieces of buffered neuron data is less than the quantity K of rows, read, according to the K storage addresses corresponding to at least one operation clock from each neural network layer stored in the storage array 420, Dim_read_num pieces of neuron data that have not been operated, and buffer the Dim_read_num pieces of neuron data to a depth plane register group Dim_data; the buffered neuron data remaining after the previous clock operation and the D*Dim_read_num pieces of neuron data buffered currently including the K pieces of neuron data required by the operation clock i.

In some embodiments, the processor 440 is configured to determine, when a remainder of dividing the quantity K of rows by the quantity D of layers is 0, a quotient of the quantity K of rows and the quantity D of layers as the quantity Dim_read_num of pieces of data that needs to be buffered in the each neural network layer in the each buffering process; and add, when the remainder of dividing the quantity K of rows by the quantity D of layers is not 0, one to the quotient of the quantity K of rows and the quantity D of layers to obtain the quantity Dim_read_num of pieces of data that needs to be buffered in the each neural network layer in the each buffering process.

In some embodiments, the depth plane register group includes a buffer array corresponding to each neural network layer, and neuron data buffered in the buffer array corresponds to buffer indexes sorted in ascending order of buffering times.

The processor 440 is configured to determine, for an $x^{th}$ row of operation units in the K rows of operation units according to the row number x, a buffer index of target neuron data in a buffer array corresponding to a current neural network layer, the target neuron data being neuron data that needs to be operated by the $x^{th}$ row of operation units in the operation clock i, x being an integer not greater than K; move, according to the buffer index, the target neuron data from the buffer array corresponding to the current neural network layer to the $x^{th}$ row of operation units; and update a next neural network layer to the current neural network layer according to a polling order, and update the quantity of pieces of buffered neuron data.

In some embodiments, the processor 440 is configured to determine, according to a remainder of dividing the quantity D of layers by the row number x, the buffer index of the target neuron data in the buffer array corresponding to the current neural network layer.

In some embodiments, the processor 440 is configured to update the buffer indexes in ascending order of the buffering times for the neuron data buffered in the buffer array of the each neural network layer in the depth plane register group Dim_data.

Based on the foregoing, according to the computer device provided in this embodiment, a neural network model to be operated is obtained, the neural network model including D neural network layers, each neural network layer including M*N pieces of neuron data; K pieces of neuron data to be operated corresponding to each operation clock are determined from M*N*D pieces of neuron data of the D neural network layers and inputted to K rows of operation units of an operation array; and an operation is performed on the inputted K pieces of neuron data in the each operation clock by using the operation array. According to the computer device, the M*N*D pieces of neuron data belonging to D dimensions in the D neural network layers are mapped to K dimensions and then allocated to the K rows of operation units, all rows in the operation array are used for operating the neural network model, to implement a full-load operation of the operation array, and the neural network model with any depth and the neural network model with any quantity of rows are compatible, thereby improving utilization of the operation array.

In addition, in this technical solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

Figure 19:
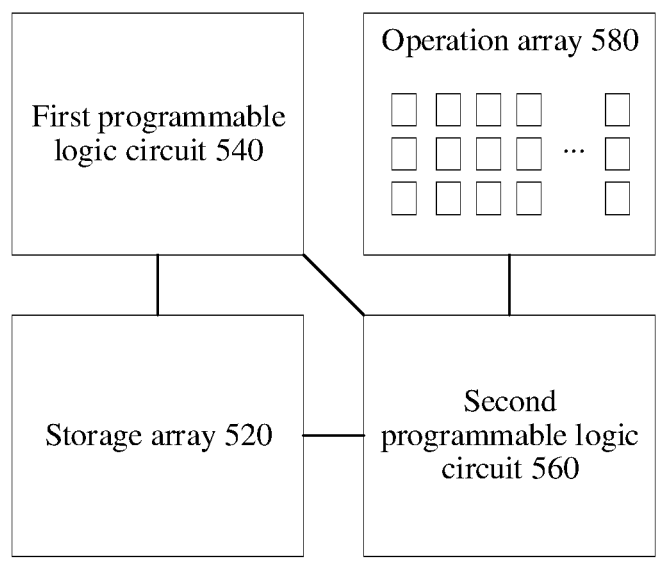
FIG. 19 is a schematic structural diagram of a chip having an operation array according to an exemplary embodiment of this disclosure.

FIG. 19 is a structural block diagram of a chip having an operation array according to an exemplary embodiment of this embodiment. When the method shown in FIG. 2 to FIG. 16 is implemented through hardware, the method is applicable to the chip. The chip includes a storage array 520, a first programmable logic circuit 540, a second programmable logic circuit 560, and an operation array 580.

The storage array 520 is configured to store a neural network model, the neural network model including D neural network layers, each neural network layer being corresponding to M rows and N columns of neuron data.

The first programmable logic circuit 540 is configured to obtain the neural network model to be operated.

The second programmable logic circuit 560 is configured to determine, from M*N*D pieces of neuron data of the D neural network layers, K pieces of neuron data to be operated corresponding to each operation clock, and input the K pieces of neuron data to be operated to K rows of operation units of the operation array 580.

The operation array 580 is configured to perform an operation on the inputted K pieces of neuron data in the each operation clock by using the operation array 580.

In some embodiments, the first programmable logic circuit 540 is configured to obtain, through an operation from the M*N*D pieces of neuron data of the D neural network layers, storage addresses of K pieces of neuron data that need to be operated by the operation array 580 in an operation clock i in the storage array 520.

The second programmable logic circuit 560 is configured to read the K pieces of neuron data from the storage array 520 according to the K storage addresses; sort the K pieces of neuron data according to a sorting rule; and input the sorted K pieces of neuron data to the K rows of operation units of the operation array 580 in the operation clock i. For the sorting rule, reference is made to the description in the method embodiments.

In some embodiments, the second programmable logic circuit 560 is configured to determine, according to a quantity K of rows of the operation array 580 and a quantity D of layers of the neural network layers, a quantity Dim_read_num of pieces of data that needs to be buffered in each neural network layer in each buffering process; determine whether a quantity of pieces of buffered neuron data remaining after a previous clock operation is less than the quantity K of rows; and when the quantity of pieces of buffered neuron data is less than the quantity K of rows, read, according to the K storage addresses corresponding to at least one operation clock from each neural network layer stored in the storage array 520, Dim_read_num pieces of neuron data that have not been operated, and buffer the Dim_read_num pieces of neuron data to a depth plane register group Dim_data; the buffered neuron data remaining after the previous clock operation and the D*Dim_read_num pieces of neuron data buffered currently including the K pieces of neuron data required for the operation clock i.

In some embodiments, the second programmable logic circuit 560 is configured to determine, when a remainder of dividing the quantity K of rows by the quantity D of layers is 0, a quotient of the quantity K of rows and the quantity D of layers as the quantity Dim_read_num of pieces of data that needs to be buffered in the each neural network layer in the each buffering process; and add, when the remainder of dividing the quantity K of rows by the quantity D of layers is not 0, one to the quotient of the quantity K of rows and the quantity D of layers to obtain the quantity Dim_read_num of pieces of data that needs to be buffered in the each neural network layer in the each buffering process.

In some embodiments, the depth plane register group includes a buffer array corresponding to each neural network layer, and neuron data buffered in the buffer array corresponds to buffer indexes sorted in ascending order of buffering times.

The second programmable logic circuit 560 is configured to determine, for an $x^{th}$ row of operation units in the K rows of operation units according to the row number x, a buffer index of target neuron data in a buffer array corresponding to a current neural network layer, the target neuron data being neuron data that needs to be operated by the $x^{th}$ row of operation units in the operation clock i, x being an integer not greater than K; move, according to the buffer index, the target neuron data from the buffer array corresponding to the current neural network layer to the $x^{th}$ row of operation units; and update a next neural network layer to the current neural network layer according to a polling order, and update the quantity of pieces of buffered neuron data.

In some embodiments, the second programmable logic circuit 560 is configured to determine, according to a remainder of dividing the quantity D of layers by the row number x, the buffer index of the target neuron data in the buffer array corresponding to the current neural network layer.

In some embodiments, the second programmable logic circuit 560 is further configured to update the buffer indexes in ascending order of buffering times for the neuron data buffered in the buffer array of the each neural network layer in the depth plane register group Dim_data.

Based on the foregoing, according to the chip having an operation array provided in this embodiment, the chip includes a storage array, a first programmable logic circuit, a second programmable logic circuit, and an operation array. D neural network layers of a neural network model are stored in the storage array, and each neural network layer includes M*N pieces of neuron data; the first programmable logic circuit is configured to obtain the neural network model to be operated; the second programmable logic circuit is configured to determine, from M*N*D pieces of neuron data of the D neural network layers, K pieces of neuron data to be operated corresponding to each operation clock, and input the K pieces of neuron data to be operated to K rows of operation units of the operation array; and the operation array performs an operation on the inputted K pieces of neuron data. According to the chip, the M*N*D pieces of neuron data belonging to D dimensions in the D neural network layers are mapped to K dimensions by using the second programmable logic circuit and then allocated to the K rows of operation units of the operation array, all rows in the operation array are used for operating the neural network model, to implement a full-load operation of the operation array, and the neural network model with any depth and the neural network model with any quantity of rows are compatible, thereby improving utilization of the operation array.

In addition, in this technical solution, the operation efficiency of the operation array is further improved. For example, in the related art, as shown in FIG. 1, nine clocks are needed for operating a 3*3*3 neural network model in an 8*8 operation array. However, in this solution, four clocks are needed for operating the 3*3*3 neural network model in the 8*8 operation array, the operation time is reduced by five clocks compared with that of the related art, and the operation efficiency of the operation array is higher.

The sequence numbers of the foregoing embodiments of this disclosure are merely for description purpose but do not imply the preference among the embodiments.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this disclosure, and are not intended to limit this disclosure. Any modification, equivalent replacement, improvement, and the like made within the spirit and principle of this disclosure shall fall within the protection scope of this disclosure.

What is claimed is:

1. A method based on a chip having an operation array, performed by a computer device comprising the chip, the operation array comprising K rows of operation units, the method comprising:
   obtaining a neural network model, the neural network model comprising D neural network layers, each neural network layer corresponding to M rows and N columns of neurons;
   determining, from the M*N*D neurons of the D neural network layers, K neurons to be operated corresponding to each operation clock cycle, sorting the K neurons according to a sorting rule comprising an input data reordering algorithm, and inputting the K neurons to be operated, after being sorted, to the K rows of operation units of the operation array in the each operation clock cycle; and
   performing an operation on the inputted K neurons in the each operation clock cycle by using the operation array, wherein M, N, D, and K are positive integers.

2. The method according to claim 1, wherein determining, from the M*N*D neurons of the D neural network layers, the K neurons to be operated corresponding to the each operation clock cycle comprises:
   obtaining, through an operation from the M*N*D neurons of the D neural network layers, K storage addresses of the K neurons that need to be operated by the operation array in an operation clock cycle i in a storage array; and
   reading the K neurons from the storage array according to the K storage addresses.

3. The method according to claim 2, wherein the sorting rule comprises:
   setting sorting of neurons from different neural network layers in a polling manner in ascending order of layer numbers or in descending order of layer numbers as a first sorting priority; and
   setting sorting of neurons from the same neural network layer in a row-column position order as a second sorting priority.

4. The method according to claim 2, wherein the sorting rule comprises:
   setting sorting of neurons from the same neural network layer in a row-column position order as a first sorting priority; and
   setting sorting of neurons from different neural network layers in ascending order of layer numbers or in descending order of layer numbers as a second sorting priority.

5. The method according to claim 3, wherein the row-column position order comprises: one of an order from left to right row-wise and from top to bottom column-wise, an order from left to right row-wise and from bottom to top column-wise, an order from right to left row-wise and from top to bottom column-wise along a column direction, and an order from right to left row-wise and from bottom to top column-wise.

6. The method according to claim 2, wherein reading the K neurons from the storage array according to the K storage addresses comprises:
   determining, according to the quantity K of rows of the operation array and the quantity D of layers of the neural network layers, a quantity Dim_read_num of data items that need to be buffered in each neural network layer in each buffering process;
   determining whether a quantity of buffered neurons remaining after a previous clock cycle is less than K; and
   when the quantity of buffered neurons is less than K, reading, according to the K storage addresses corresponding to at least one operation clock cycle from each neural network layer stored in the storage array, Dim_read_num neurons that have not been operated, and buffering the Dim_read_num neurons to a depth plane register group Dim_data,
   the buffered neurons remaining after the previous clock cycle and the D*Dim_read_num neurons buffered currently comprising the K neurons required by a current operation clock cycle.

7. The method according to claim 6, wherein determining, according to the quantity K of rows of the operation array and the quantity D of layers of the neural network layers, the quantity Dim_read_num of data items that need to be buffered in each neural network layer in the each buffering process comprises:
   determining, when a remainder of dividing K by D is 0, a quotient of K divided by D as the quantity Dim_read_num of data items that need to be buffered in the each neural network layer in the each buffering process; and
   adding, when the remainder of dividing K by D is not 0, one to the quotient of K divided by D to obtain the quantity Dim_read_num of data items that need to be buffered in the each neural network layer in the each buffering process.

8. The method according to claim 6, wherein the depth plane register group comprises a buffer array corresponding to each neural network layer, and neurons buffered in the buffer array corresponds to buffer indexes sorted in ascending order of buffering times; and sorting the K neurons according to the sorting rule, and inputting the sorted K neurons to the K rows of operation units of the operation array in the each operation clock cycle comprises:

determining, for an $x^{th}$ row of operation units in the K rows of operation units according to a row number x, a buffer index of target neurons in the buffer array corresponding to a current neural network layer, the target neurons needing to be operated by the $x^{th}$ row of operation units in the each operation clock cycle, x being an integer not greater than K;

moving, according to the buffer index, the target neurons from the buffer array corresponding to the current neural network layer to the $x^{th}$ row of operation units; and updating a next neural network layer as the current neural network layer according to a polling order, and updating the quantity of buffered neurons.

9. The method according to claim 8, wherein determining, according to the row number x, the buffer index of target neurons in the buffer array corresponding to the current neural network layer comprises:

determining, according to a remainder of dividing D by x, the buffer index of the target neurons in the buffer array corresponding to the current neural network layer.

10. The method according to claim 9, further comprising:

updating the buffer indexes in an ascending order of buffering times for the neurons buffered in the buffer array of the each neural network layer in the depth plane register group Dim_data.

11. An operation apparatus based on a chip having an operation array, the apparatus being connected to the operation array, the operation array comprising K rows of operation units, the apparatus comprising a circuitry configured to:

obtain a neural network model, the neural network model comprising D neural network layers, each neural network layer corresponding to M rows and N columns of neurons;

determine, from M*N*D pieces of neurons of the D neural network layers, K neurons to be operated corresponding to each operation clock cycle, sort the K neurons according to a sorting rule comprising an input data reordering algorithm, and input the K neurons to be operated, after being sorted, to the K rows of operation units of the operation array in the each operation clock cycle; and perform an operation on the inputted K neurons in the each operation clock cycle by using the operation array, wherein M, N, D, and K are positive integers.

12. The apparatus according to claim 11, wherein to determine, from the M*N*D neurons of the D neural network layers, the K neurons to be operated corresponding to the each operation clock cycle, the circuitry is configured to:

obtain, through an operation from the M*N*D neurons of the D neural network layers, K storage addresses of the K neurons that need to be operated by the operation array in an operation clock cycle i in a storage array; and read the K neurons from the storage array according to the K storage addresses.

13. The apparatus according to claim 12, wherein to read the K neurons from the storage array according to the K storage address, the circuitry is configured to:

determine, according to the quantity K of rows of the operation array and the quantity D of layers of the neural network layers, a quantity Dim_read_num of data items that needs to be buffered in each neural network layer in each buffering process;

determine whether a quantity of buffered neurons remaining after a previous clock cycle is less than K; and when the quantity of buffered neurons is less than K, read, according to the K storage addresses corresponding to at least one operation clock cycle from each neural network layer stored in the storage array, Dim_read_num pieces of neurons that have not been operated, and buffer the Dim_read_num neurons to a depth plane register group Dim_data, the buffered neurons remaining after the previous clock cycle and the D*Dim_read_num neurons buffered currently comprising the K neurons required by a current operation clock cycle.

14. The apparatus according to claim 13, wherein to determine, according to the quantity K of rows of the operation array and the quantity D of layers of the neural network layers, the quantity Dim_read_num of data items that need to be buffered in each neural network layer in each buffering process, the circuitry is configured to:

determine, when a remainder of dividing K by D is 0, a quotient of K divided by D as the quantity Dim_read_num of data that need to be buffered in the each neural network layer in the each buffering process; and add, when the remainder of dividing K by D is not 0, one to the quotient of K divided by D to obtain the quantity Dim_read_num of data that needs to be buffered in the each neural network layer in the each buffering process.

15. The apparatus according to claim 13, wherein the depth plane register group comprises a buffer array corresponding to each neural network layer, and neurons buffered in the buffer array corresponds to buffer indexes sorted in ascending order of buffering times; and wherein to sort the K neurons according to the sorting rule, the circuitry is configured to:

determine, for an $x^{th}$ row of operation units in the K rows of operation units according to a row number x, a buffer index of target neurons in the buffer array corresponding to a current neural network layer, the target neurons needing to be operated by the $x^{th}$ row of operation units in the each operation clock cycle, x being an integer not greater than K;

move, according to the buffer index, the target neurons from the buffer array corresponding to the current neural network layer to the $x^{th}$ row of operation units; and update a next neural network layer as the current neural network layer according to a polling order, and update the quantity of buffered neurons.

16. The apparatus according to claim 15, wherein to determine, for the $x^{th}$ row of operation units in the K rows of operation units according to the row number x, the buffer index of the target neurons, the circuitry is configured to:

determine, according to a remainder of dividing D by x, the buffer index of the target neurons in the buffer array corresponding to the current neural network layer.

17. The apparatus according to claim 16, wherein the circuitry is further configured to:
- update the buffer indexes in an ascending order of buffering times for the neurons buffered in the buffer array of the each neural network layer in the depth plane register group Dim_data.

18. A chip having an operation array, applicable to operation of a neural network model, the chip comprising:
- a storage array, a first programmable logic circuit, a second programmable logic circuit, and the operation array, the first programmable logic circuit being electrically connected to the storage array and the second programmable logic circuit, the second programmable logic circuit being electrically connected to the storage array and the operation array, the operation array comprising K rows and L columns of operation units, wherein:
- the storage array is configured to store the neural network model, the neural network model comprising D neural network layers, each neural network layer corresponding to M rows and N columns of neurons;
- the first programmable logic circuit is configured to obtain the neural network model to be operated;
- the second programmable logic circuit being configured to determine, from M*N*D neurons of the D neural network layers, K neurons to be operated corresponding to each operation clock cycle, sort the K neurons according to a sorting rule comprising an input data reordering algorithm, and input the K neurons to be operated after being sorted, to the K rows of operation units of the operation array in the each operation clock cycle;
- the operation array being configured to perform an operation on the inputted K neurons in the each operation clock cycle by using the operation array; and
- M, N, D, and K are positive integers.

19. The chip according to claim 18, wherein
- the first programmable logic circuit is configured to obtain, through an operation from the M*N*D neurons of the D neural network layers, K storage addresses of the K neurons that need to be operated by the operation array in each operation clock cycle in a storage array; and
- the second programmable logic circuit is configured to read the K neurons from the storage array according to the K storage addresses.

20. A non-transitory computer-readable storage medium, storing computer-readable instructions, the computer-readable instructions, when executed by one or more processors, causing the one or more processors to perform operations in the method according to claim 1.

* * * * *